(12) United States Patent
Fukuzawa et al.

(10) Patent No.: US 7,275,626 B2
(45) Date of Patent: Oct. 2, 2007

(54) DAMPER DEVICE

(75) Inventors: Eiji Fukuzawa, Kitakyushu (JP);
Takayuki Tomura, Miyako-gun (JP);
Naohisa Tanaka, Miyako-gun (JP);
Ryosuke Hayashi, Kitakyushu (JP);
Seiichiro Inoue, Kitakyushu (JP);
Yoshiro Terada, Kitakyushu (JP);
Satoshi Kato, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 194 days.

(21) Appl. No.: 10/523,049

(22) PCT Filed: Jul. 14, 2003

(86) PCT No.: PCT/JP03/08949

§ 371 (c)(1),
(2), (4) Date: Feb. 2, 2005

(87) PCT Pub. No.: WO2004/013514

PCT Pub. Date: Feb. 12, 2004

(65) Prior Publication Data

US 2006/0011427 A1    Jan. 19, 2006

(30) Foreign Application Priority Data

Aug. 2, 2002  (JP) .............................. 2002-226656
Aug. 28, 2002  (JP) .............................. 2002-248567

(51) Int. Cl.
*F16D 57/02*    (2006.01)

(52) U.S. Cl. .......................................... 188/296; 16/54

(58) Field of Classification Search ................ 188/290, 188/296, 293; 16/49, 51, 53, 54
See application file for complete search history.

(56) References Cited

U.S. PATENT DOCUMENTS

| 5,064,033 | A | * | 11/1991 | Koike et al. ................. 188/306 |
| 5,111,548 | A | * | 5/1992 | Ohshima ........................ 16/51 |
| 5,165,506 | A | * | 11/1992 | Guimbretiere .............. 188/290 |
| 5,305,858 | A | * | 4/1994 | Haga et al. .................. 188/271 |
| 6,121,526 | A | | 9/2000 | Kobori et al. |

FOREIGN PATENT DOCUMENTS

| JP | 5-41499 | 6/1993 |
| JP | 5-296267 | 11/1993 |
| JP | 6-40485 | 5/1994 |

* cited by examiner

*Primary Examiner*—Xuan Lan Nguyen
(74) *Attorney, Agent, or Firm*—Jordan and Hamburg LLP

(57) ABSTRACT

A damper device includes a check valve operated to apply braking force to a rotary shaft having wing portions when rotated in a cylinder in one direction and, when the rotary shaft is rotated in the opposite direction, the check valve is not operated. Movement restricting flow passages for restricting the movement of a viscous fluid between front and rear-side oil chambers divided by the wing portions are formed between an inner wall of the cylinder and the wing portions, and a selective communication passage having the check valve is formed between the wing portions and one of two side walls forming the oil chambers, such that the side wall and the check valve can be rotated along with the rotation of the wing portions, thereby avoiding rotation of the check valve in contact with the inner wall of the cylinder, for pronged service life of the damper device.

3 Claims, 22 Drawing Sheets

SLOW END REGION  QUICK START REGION

DAMPER DEVICE

TECHNICAL FIELD

The present invention relates to a damper device. The present invention relates more particularly to a damper device which is configured such that when a rotary shaft is rotated in one direction, a check valve is operated to apply a proper braking force and when the rotary shaft is rotated in the other direction, the check valve is not operated and a slight braking force is applied.

BACKGROUND ART

Recently, with respect to various types of equipment which include an open/close mechanism, there has been known an equipment in which a damper device is contiguously connected to an open/close shaft so as to attenuate or alleviate an impact which the equipment receives at the time of opening or closing the equipment. For example, in a warm water part cleaning device which is popularly used in view of the cleanliness and the hygiene thereof, a damper device is connected to an open/close shaft to alleviate an impact at the time of opening or closing a toilet lid, a toilet seat or the like.

As such a conventional damper device, there has been known the structure disclosed in Japanese Laid-open Patent Publication Hei5(1993)-296267.

That is, in the conventional damper device 200, as shown in FIG. 29, a columnar rotary shaft 203 is rotatably inserted in the inside of the hollow tubular cylinder 202, while a check valve 204 is formed between the cylinder 202 and the rotary shaft 204.

The cylinder 202 forms a pair of left and right partition walls 202a on an inner peripheral wall thereof in a state that the partition walls 202a project inwardly and, at the same time, the rotary shaft 203 is rotatably supported on distal end portions of the partition walls 202a. Oil is filled in an inner space 205.

The rotary shaft 203 forms wing portions 206 thereon in a state that the wing portions 206 project radially and, at the same time, check valves 204 are formed between distal end portions of the wing portions 206 and an inner peripheral wall of the cylinder 202. With the provision of these wing portions 206 and check valves 204, the inner space 205 of the cylinder 202 is divided into two chambers, that is, a pressure increasing chamber 205a which is formed on an front side with respect to the rotational direction of the rotary shaft 203 and a pressure reducing chamber 205a which is formed on a rear side with respect to the rotational direction of the rotary shaft 203.

The check valves 204 have outer portions thereof come into contact with an inner peripheral surface of the cylinder 202 and inner portions thereof surround the wing portions 206 of the rotary shaft 203. Due to such a constitution, a communication passage 207 which allows the pressure increasing chamber 205a and the pressure reducing chamber 205b to communicate with each other is formed between the inner portion and the wing portion 206, at the same time, a control port 208 is formed in the communication passage 207 on a pressure reducing chamber 205b side.

Here, in the drawing, numeral 209 indicates an O ring, numeral 210 indicates a cap which seals a distal end of the cylinder 202.

Then, in the damper device 200, when the rotary shaft 203 is rotated toward a front side, gaps between the wing portions 206 and the check valves 204 are eliminated and hence, a quantity of oil which flows into the pressure reducing chambers 205b from the pressure increasing chambers 205a is restricted by the check valves 204 whereby a rotational speed of the rotary shaft 203 is suppressed. On the other hand, when the rotary shaft 203 is rotated toward a rear side, gaps between the wing portions 206 and the check valves 204 assume a released state and hence, the quantity of oil is no more restricted whereby the rotary shaft 203 is smoothly rotated.

In this manner, the damper device 200 is configured such that when the rotary shaft 203 is rotated toward the front side, the check valves 204 are operated and hence, a large braking force is applied to the rotary shaft 203, while when the rotary shaft 203 is rotated toward the rear side, the check valves 204 are not operated and hence, a small braking force is applied to the rotary shaft 203.

The damper device 200 having the above-mentioned constitution is, as shown in FIG. 30, interposed between a cleaning device body 212 and a toilet seat 213 and a toilet lid 214 mounted on a toilet bowl.

Then, when a user merely lightly pushes the toilet seat 213 or the toilet lid 214 downwardly, the toilet seat 213 or the toilet lid 214 is gradually rotated downwardly due to an action of the damper device 200 whereby it is possible to preliminarily alleviate an impact which the toilet lid 213 or the toilet seat 214 receives upon impinging on a toilet bowl.

However, in the above-mentioned conventional damper device 200, since the check valves 204 are formed between the cylinder 202 and the rotary shaft 203, due to a size error on the cylinder 202 and the rotary shaft 203 caused during manufacturing, the cylinder 202 and the rotary shaft 203 are easily displaced from each other in the axial direction at the time of assembling the rotary shaft 203 into the cylinder 202 and hence, there exists a possibility that the individual difference (or irregularities) arises with respect to gaps between the bottom wall of the cylinder 202 and the wing portions 206.

When the individual difference arises with respect to gaps between the bottom wall of the cylinder 202 and the wing portions 206 at the time of manufacturing, a quantity of oil which flows into the pressure reducing chambers 205b from the pressure increasing chambers 205a through the gaps becomes different and hence, a braking force which is applied to the rotary shaft 203 by the damper device 200 becomes different for every damper device whereby it is difficult for the damper device 200 to obtain the stable quality and characteristics.

Further, since the check valves 204 are formed between the cylinder 202 which is not rotated and the rotary shaft 203 which is rotated, when the check valves 204 are operated so as to generate the braking force, the check valves 204 are strongly brought into contact with the cylinder 202 and hence, there exists a possibility that the check valves 204 are worn and broken thus giving rise to a drawback with respect to the durability of the damper device 200.

DISCLOSURE OF THE INVENTION

In view of the above, according to the present invention described in claim 1, in a damper device which includes an approximately tubular cylinder, a rotary shaft which is rotatably arranged in the inside of the cylinder and forms wing portions on an outer peripheral portion of an approximately columnar shaft in a state that the wing portions project to an inner peripheral surface of the cylinder, two side walls which are formed in a spaced-apart manner between the rotary shaft and the inner wall of the cylinder, an oil chamber which is defined by the above-mentioned two side walls, the rotary shaft and the inner wall of the cylinder and in which a viscous fluid is filled, movement restricting flow passages which restrict the movement of the viscous fluid between front-side oil chambers with respect to the rotational direction of the rotary shaft and rear-side oil chambers with respect to the rotational direction of the rotary shaft which are formed by dividing the oil chamber with the wing portions, and selective communication passages which are provided with check valves which selectively restrict the movement of the viscous fluid from the front-side oil chambers to the rear-side oil chambers in response to the rotational direction of the rotary shaft whereby a rotation resistance force having the directivity is applied to the rotary shaft due to the flow resistance which is generated when the viscous fluid moves from the front-side oil chambers to the rear-side oil chambers, the improvement is characterized in that the movement restricting flow passages are formed between the inner wall of the cylinder and the wing portions and, at the same time, the selective communication passages are formed between the wing portions and one side wall out of the above-mentioned two side walls, and the side walls and the check valves are rotated along with the rotation of the wing portions (see the embodiment 1 to the embodiment 5).

Further, according to the present invention described in claim 2, based on the invention described in claim 1, the side wall which defines the selective communication passage is formed of a side wall member which is replaceably engaged with the rotary shaft (see the embodiment 1 to embodiment 5).

Further, according to the present invention described in claim 3, based on the invention described in claim 2, the check valves are configured such that valve elements which open and close the selective communication passages are movably arranged in valve element accommodating chambers which are formed in the wing portions and/or the side wall member which at middle portions of the selective communication passages (see the embodiment 1 and the embodiment 2).

Further, according to the present invention described in claim 4, based on the invention described in claim 3, the side wall member is arranged movably in the axial direction of the rotary shaft and, at the same time, on at least one of the valve elements and the side wall member which form closing portions with which the valve elements are brought into contact at the time of closing operation, inclined surfaces which are inclined with respect to the moving direction of the valve element and the axial direction of the rotary shaft are formed (see the embodiment 1 and the embodiment 2).

Further, according to the present invention described in claim 5, based on the invention described in claim 4, the valve elements are formed in an approximately columnar shape (see the embodiment 1 and the embodiment 2).

Further, according to the present invention described in claim 6, based on the invention described in any one of claim 1 to claim 5, between the front-side oil chamber and the rear-side oil chamber, a bypass flow passage having a resilient flow passage member which is resiliently deformed to increase a flow passage cross-sectional area when an inner pressure of the viscous fluid is increased is formed and, at the same time, a sealing member which seals between the side wall member and the cylinder is used as the resilient flow passage member (see the embodiment 1 and the embodiment 2).

Further, according to the present invention described in claim 7, based on the invention described in claim 6, an O-ring is used as the resilient flow passage member (see the embodiment 1, the embodiment 2).

Further, according to the present invention described in claim 8, based on the invention described in claim 1 or claim 2, the check valves are arranged in a state that the valve elements which are brought into contact with and are separated from the wing portions are movable in the circumferential direction of the rotary shaft (see the embodiment 3 to the embodiment 5).

Further, according to the present invention described in claim 9, based on the invention described in claim 8, on at least one of the valve elements and the wing portions which form closing portions with which the valve elements are brought into contact at the time of closing operation, inclined surfaces which are inclined with respect to the moving direction of the valve element and the axial direction of the rotary shaft are formed (see the embodiment 3 to the embodiment 5).

Further, according to the present invention described in claim 10, based on the invention described in claim 8 or claim 9, the valve elements are constituted by forming valve element portions which are brought into contact with and are separated from the wing portions on an approximately circular annular ring portion which is loosely fitted on the rotary shaft (see the embodiment 3 to the embodiment 5).

Further, according to the present invention described in claim 11, based on the invention described in any one of claim 8 to claim 10, between the front-side oil chamber and the rear-side oil chamber, a bypass flow passage having a resilient flow passage member which is resiliently deformed to increase a flow passage cross-sectional area when an inner pressure of the viscous fluid is increased is formed and, at the same time, the valve elements are used as the resilient flow passage member (see the embodiment 3 to the embodiment 5).

Further, according to the present invention described in claim 12, based on the invention described in any one of claim 1 to claim 11, speed adjusting flow passages which adjust a flow rate of the viscous fluid which moves between the front-side oil chambers and the rear-side oil chambers in response to a rotational angle of the rotary shaft are formed between the side wall and the wing portions, and the speed adjusting flow passages are configured to decrease a flow passage cross-sectional area along with the increase of the rotational angle of the rotary shaft (see the embodiment 2 to the embodiment 5).

Further, according to the present invention described in claim 13, based on the invention described in claim 12, the speed adjusting flow passages are configured to decrease the flow passage cross-sectional area on a rotary finishing end side of the rotary shaft in a plurality of stages (see the embodiment 3 to the embodiment 5).

Further, according to the present invention described in claim 14, based on the invention described in any one of claim 1 to claim 13, an air bleeding groove for bleeding a gas remaining in the oil chamber to the outside at the time of filling the viscous fluid in the oil chamber is formed in the cylinder (see the embodiment 1 to the embodiment 5).

Figure 1:
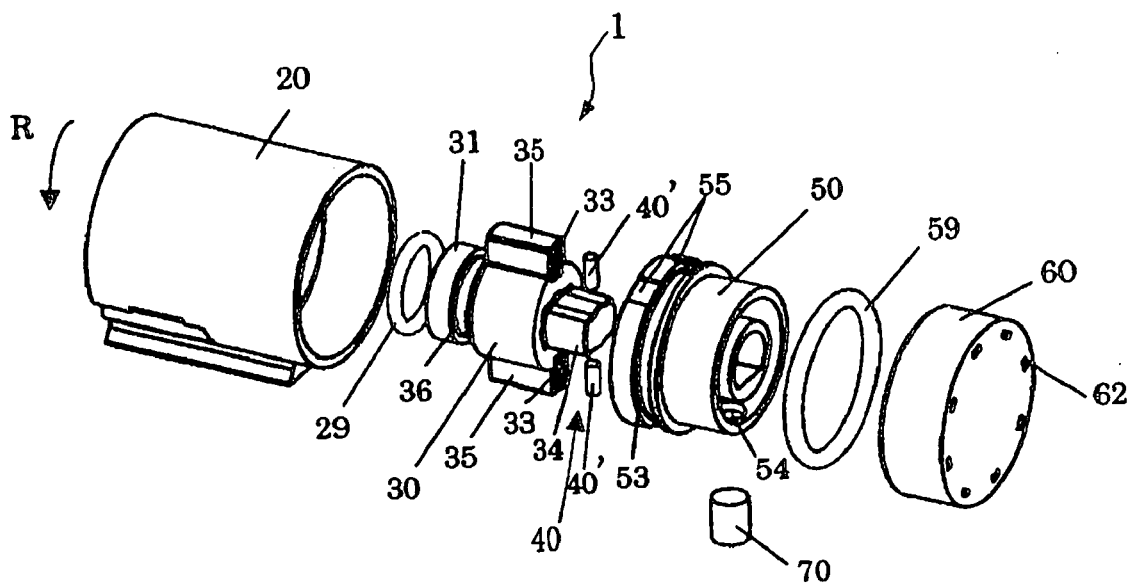
FIG. 1 is an exploded perspective view showing a damper device according to the first embodiment.

BEST MODE FOR CARRYING OUT THE INVENTION a damper device according to the present invention is configured as follows. That is, the damper device includes an approximately tubular cylinder, a rotary shaft which is rotatably arranged in the inside of the cylinder and forms wing portions on an outer peripheral portion of an approximately columnar shaft in a state that the wing portions project to an inner peripheral surface of the cylinder, two side walls which are formed in a spaced-apart manner between the rotary shaft and the inner wall of the cylinder, an oil chamber which is defined by the above-mentioned two side walls, the rotary shaft and the inner wall of the cylinder and in which a viscous fluid is filled, movement restricting flow passages which restrict the movement of the viscous fluid between front-side oil chambers with respect to the rotational direction of the rotary shaft and rear-side oil chambers with respect to the rotational direction of the rotary shaft which are formed by dividing the oil chamber with the wing portions, and selective communication passages which are provided with check valves which selectively restrict the movement of the viscous fluid from the front-side oil chambers to the rear-side oil chambers in response to the rotational direction of the rotary shaft whereby a rotation resistance force having the directivity is applied to the rotary shaft due to the flow resistance which is generated when the viscous fluid moves from the front-side oil chambers to the rear-side oil chambers.

Further, according to the present invention, the movement restricting flow passages are formed between the inner wall of the cylinder and the wing portions and, at the same time, the selective communication passages are formed between the wing portions and one side wall out of the above-mentioned two side walls, and the side walls and the check valves are rotated along with the rotation of the wing portions.

Particularly, the side wall which forms the selective communication passages is formed of a side wall member which original is replaceably mounted on the rotary shaft.

To be more specific, in the damper device, the columnar rotary shaft is rotatably arranged in the inside of the approximately tubular cylinder which defines the hollow oil chamber therein. The wing portions which slide along the inner peripheral wall of the oil chamber of the cylinder are formed on the rotary shaft in a state that the wing portions project from the rotary shaft in the radial direction of the rotary shaft. With the use of the wing portions, the oil chamber in the cylinder is divided into two chambers, that is, the front-side oil chamber on the front side in the rotational direction and the rear-side oil chamber on the rear side in the rotational direction. A rotary body which constitutes the side wall member which is movable in the axial direction of the rotary shaft and is integrally rotated with the rotary shaft is contiguously connected with the rotary shaft thus forming the movement restricting flow passages between the inner wall of the cylinder and the wing portions and, at the same time, the selective communication passages which allow the front-side oil chamber and the rear-side oil chamber to be connected with each other are formed between the wing portions of the rotary shaft and the rotary body and the check valves are formed in the selective communication passages. Further, the oil which constitutes the viscous fluid is filled in the oil chamber of the cylinder and the oil chamber of the cylinder is sealed with a lid.

In this manner, since the check valves are formed in the selective communication passages which are formed between the oil-chamber-side wall of the cylinder and the wing portions of the rotary shaft, it is possible to manufacture the damper device by sequentially assembling the rotary shaft and the check valves to the cylinder and hence, the manufacture of the damper device is facilitated whereby the manufacturing cost can be reduced.

Particularly, when the side wall of the oil chamber is formed of the rotary body which is integrally rotated with the rotary shaft, the check valves are eventually formed between the rotary shaft and the rotary body which are integrally rotated with each other. Accordingly, the check valves are not brought into contact with the inner peripheral wall of the cylinder and hence, even when the damper device is used for a long period, there is no possibility that the check valves are worn so that gaps are formed between the check valves and the inner peripheral wall of the cylinder whereby the lifetime of the damper device can be prolonged.

Hereinafter, specific embodiments of the damper device according to the present invention are explained in conjunction with drawings.

First Embodiment

The damper device 1 according to the first embodiment includes, as shown in FIG. 1, a cylinder 20, a rotary shaft 30, check valves 40, a rotary body 50 and a lid 60. In the drawing, numerals 29, 59 indicate O-rings which constitute sealing members for sealing oil in the inside of the cylinder 20. Further, numeral 70 indicates a permanent magnet. The permanent magnet 70 is provided for detecting a rotational position (a rotational angle) of the rotary shaft 30 using a Hall IC which is arranged at a position close to the damper device 1 and may be omitted when it is unnecessary to detect the rotational position.

Figure 2:
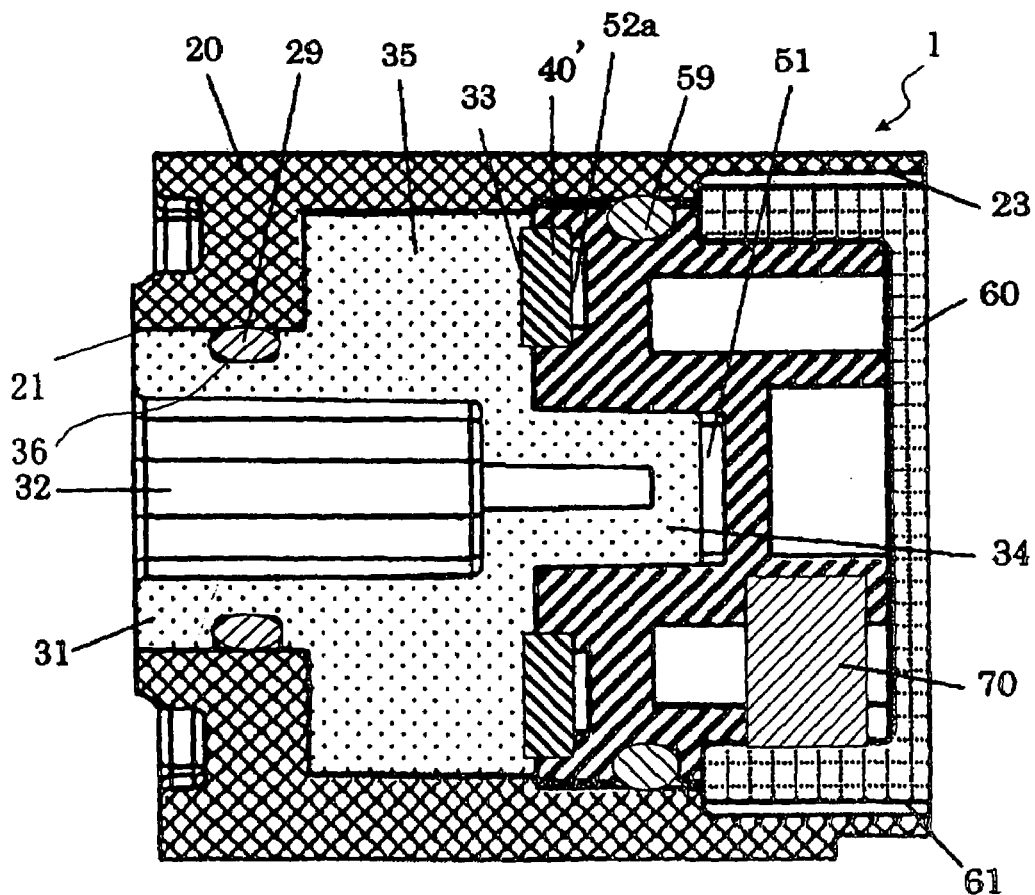
FIG. 2 is a cross-sectional view showing the damper device according to the first embodiment.
Figure 3:
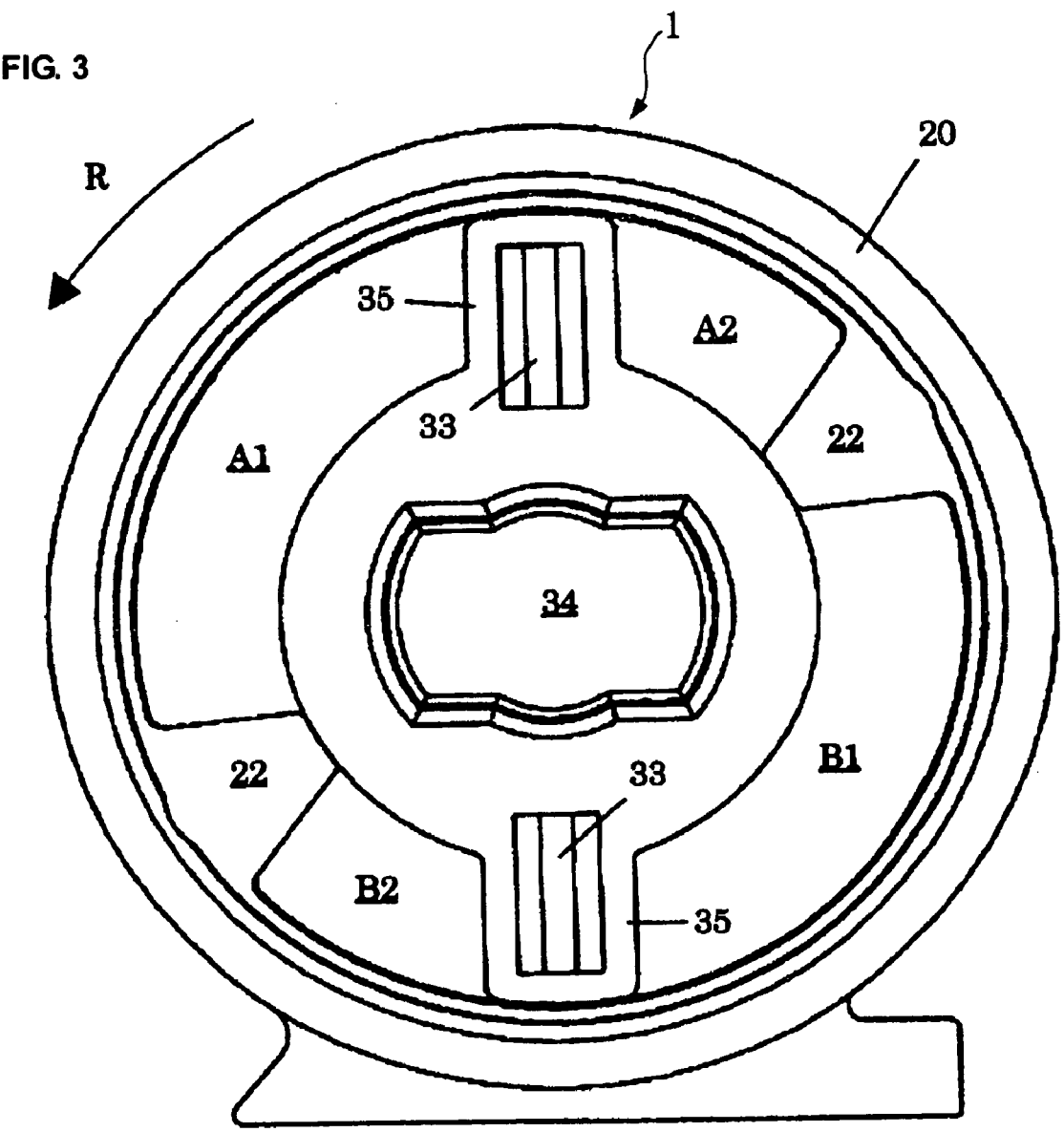
FIG. 3 is a side view showing a cylinder and a rotary shaft of the damper device according to the first embodiment.
Figure 7:
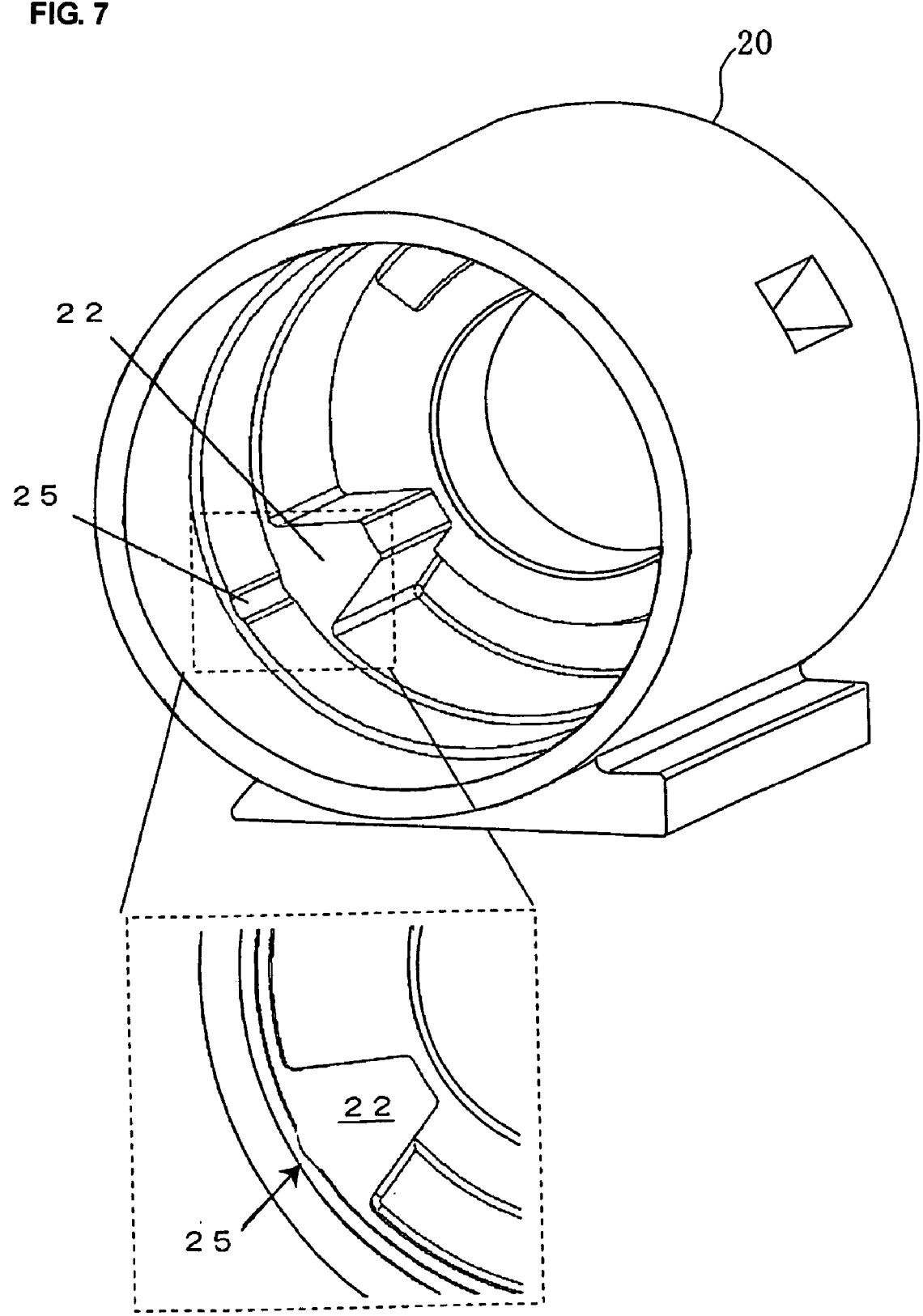
FIG. 7 is an enlarged perspective view showing the cylinder of the damper device according to the first embodiment.

The cylinder 20 is formed in a bottomed tubular shape having a hollow portion which defines an oil chamber. As shown in FIG. 2, the cylinder 20 forms a through hole 21 for rotatably supporting the rotary shaft 30 in a bottom portion thereof. Further, as shown in FIG. 3, the cylinder 20 forms a pair of partition walls 22, 22 on a bottom portion side of the inner wall in a state that the partitions walls 22, 22 face each other in an opposed manner. As shown in FIG. 2, a female thread portion 23 is formed on an open-end side of the inner wall. Further, as shown in FIG. 7, an air bleeding groove 25 which is used at the time of filling oil is formed in the cylinder 20 in a middle portion of the inner wall.

The rotary shaft 30 is rotatably supported in the inside of the cylinder 20.

The rotary shaft 30 is formed in an approximately columnar shape, wherein the rotary shaft 30 forms an approximately columnar output shaft 31 on a proximal end side thereof (on a left end side in FIG. 1 and FIG. 2), forms a pair of wing portions 35, 35 on an outer periphery thereof. in a state that the wing portions 35, 35 extend in the radially direction in an opposed manner, and forms a connecting shaft 34 having an approximately rectangular cross section on a distal end side thereof (a right end side in FIG. 1 and FIG. 2).

Here, the output shaft 31 forms a connecting hole 32 for connecting the output shaft 31 to an open/close shaft of a toilet seat, a toilet lid and the like in a center portion thereof. Further, the output shaft 31 forms an O-ring groove 36 in which an O-ring 29 is fitted on an outer periphery thereof.

Further, the wing portions 35 slide along an inner peripheral wall of the hollow portion of the cylinder 20. The wing portions 35 divide the hollow portion of the cylinder 20 into two chambers, that is, front-side oil chambers (pressure increasing chambers A1, B1) which are formed on a front side with respect to the rotational direction of the rotary shaft 30 and rear-side oil chambers (pressure reducing chambers A2, B2) which are formed on a rear side with respect to the rotational direction of the rotary shaft 30. Then, between the wing portions 35 and the inner wall of the cylinder 20, given gaps are provided thus forming movement restricting flow passages which restrict the movement of the oil between the front-side oil chamber and the rear-side oil chamber so as to apply a given braking force to the rotary shaft 30 when the rotary shaft 30 is rotated. Further, the wing portions 35 form valve accommodating recessed portions 33 for accommodating the valve elements 40' which constitute the check valves 40 in a rear end portion (a right end portion in FIG. 1 and FIG. 2).

The rotary body 50 is replaceably engaged with the rotary shaft 30 and, further, is contiguously formed on the connecting shaft 34 of the rotary shaft 30 in a state that the rotary body 50 is movable in the axial direction. Further, the rotary body 50 is integrally rotated with the rotary shaft 30. An inner end surface of the rotary shaft 50 forms one side wall of the oil chamber in the inside of the cylinder 20. Here, another side wall of the oil chamber is formed by the bottom wall of the cylinder 20.

The rotary body 50 is formed in an approximately columnar shape having an outer diameter slightly smaller than an inner diameter of the cylinder 20. The rotary body 50 forms a connecting hole 51 which is connected with the connecting shaft 34 in a center portion of a front end side (a left end side in FIG. 1 and FIG. 2) thereof. Further, the rotary body 50 forms a valve accommodating recessed portion 52 for accommodating the valve element 40' which constitutes the check valve 40 in a peripheral portion of a front end side thereof. Still further, the rotary body 50 forms an O-ring groove 53 which allows the fitting of an O-ring 59 therein and a pair of bypass grooves 55, 55 which are communicated with the O-ring groove 53 on an outer periphery thereof (see FIG. 6).

The lid 60 is formed in a bottomed cylindrical shape and forms a male thread portion 61 which is threadedly engaged with a female thread portion 23 of the cylinder 20 formed on an outer periphery thereof. Further, the lid 60 is provided for preventing the rotary shaft 30 and the rotary body 50 which are arranged in the inside of the cylinder 20 from being removed from the cylinder 20 and for rotatably supporting the rotary body 50 in a hollow portion thereof. Further, the lid 60 forms a mounting groove 62 for allowing the mounting of an assembling exclusive-use jig (a rotating tool) on a rear end (a right end in FIG. 1 and FIG. 2) thereof.

The damper device 1 forms communication passages 52a which allow the front-side oil chamber and the rear-side oil chamber to be communicated with each other between the wing portions 35 of the rotary shaft 30 and the rotary body 50, while the check valves 40 are formed in the communication passages 52a. These communication passages 52a function as selective communication passages provided with the check valves 40 which selectively restrict the movement of the oil corresponding to the rotational direction of the rotary shaft 30 when the oil moves from the front-side oil chamber to the rear-side oil chamber.

Figure 4:
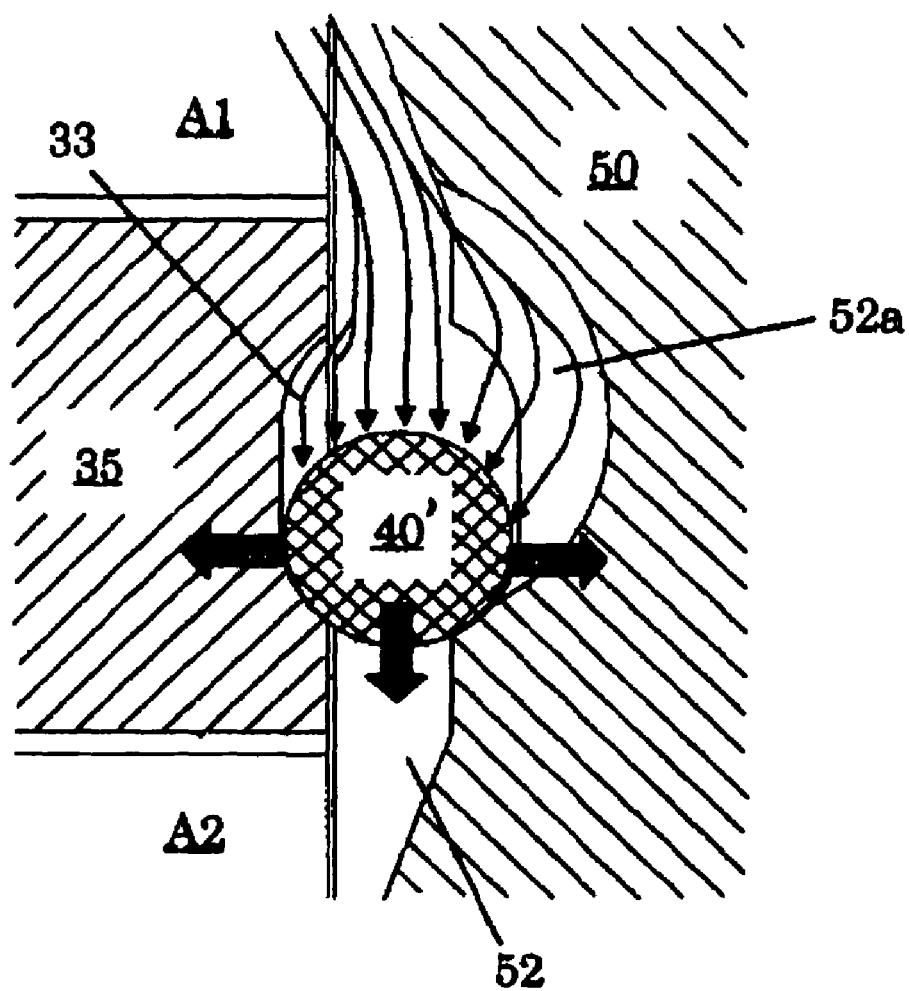
FIG. 4 is an explanatory view showing a check valve (in a valve-closed state) of the damper device according to the first embodiment.
Figure 5:
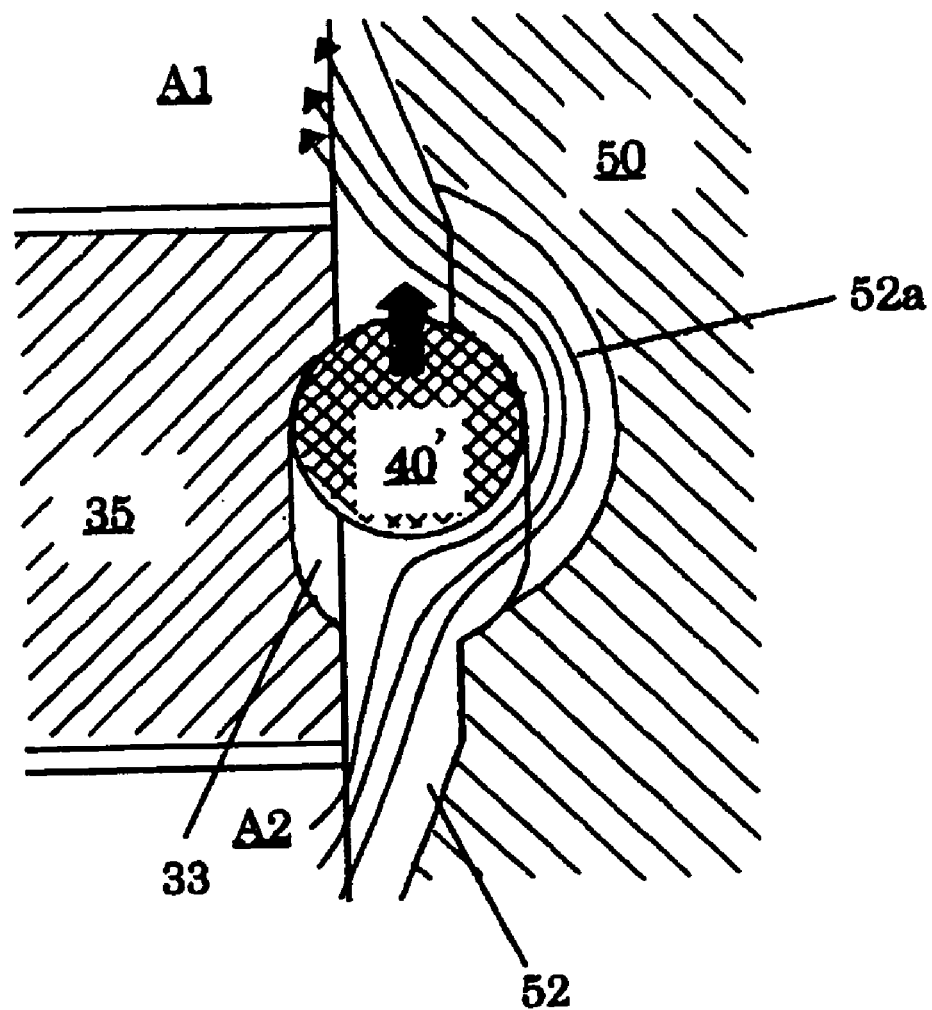
FIG. 5 is an explanatory view showing a check valve (in a valve-opened state) of the damper device according to the first embodiment.
Figure 6:
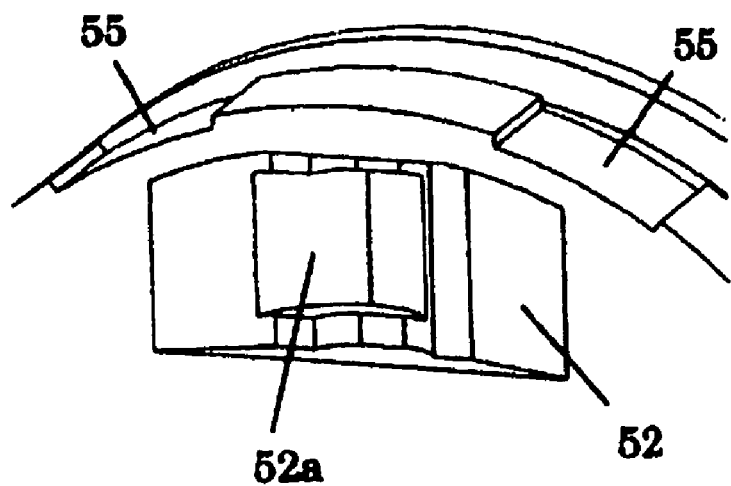
FIG. 6 is an enlarged perspective view showing a rotary body of the damper device according to the first embodiment.

Then, as shown in FIG. 4 to FIG. 6, the check valves 40 is configured such that the columnar valve element 40' is accommodated in a valve element accommodating chamber which is constituted of a valve accommodating recessed portion 33 formed in the wing portion 35 and a valve accommodating recessed portion 62 formed in the rotary body 50 in a state that the valve element 40' is movable in a tangential direction of the rotary shaft 30. A gap of the valve element accommodating chamber is set slightly wider than an outer diameter of the valve element 40' at a center portion thereof so as to allow the movement of the valve element 40'. Further, the gap of the valve element accommodating chamber is, at both end portions thereof, set narrower than an outer diameter of the valve element 40' and, at the same time, is formed in a curved shape having a radius of curvature slightly larger than the columnar diameter of the valve element 40' so as to restrict the movement of the valve element 40'. Further, in a center portion of the valve accommodating recessed portion 52, the communication passage 52a having a curved shape in cross section is formed in a state that one end thereof is arranged at a position which faces one end of the valve accommodating recessed portion 33 in an opposed manner and another thereof is arranged at a position displaced outwardly from an end portion of the valve accommodating recessed portion 33. In this manner, the end portion of the valve element accommodating chamber and a profile (a columnar surface) of the valve element 40' form inclined surfaces in the moving direction of the valve element 40' and the axial direction of the rotary shaft 30. Here, in this embodiment, the inclined surfaces are formed on both of the valve element accommodating chamber (valve accommodating recessed portion 33, 52) and the valve element 40'. However, the present invention is not limited to such a constitution and the inclined surface may be formed on either one of the valve element accommodating chamber (valve accommodating recessed portion 33, 52) and the valve element 40'.

Then, when the check valve 40 is, as shown in FIG. 4, positioned on the pressure-reducing-chamber-side end portion, the communication passage 52a is closed by the valve element 40' and hence, the oil cannot flow from the pressure increasing chamber A1 to the pressure reducing chamber A2 through the communication passage 52a. On the other hand, as shown in FIG. 5, when the valve element 40' is positioned on the pressure-increasing-chamber-side end portion, the communication passage 52a is not completely closed by the valve element 40' and hence, the oil flows toward the pressure reducing chamber A2 from the pressure increasing chamber A1 through the communication passage 52a.

Accordingly, when the rotary shaft 30 is rotated toward frontwardly (in the direction indicated by an arrow R in FIG. 1 and FIG. 3), the oil in the inside of the pressure increasing chambers A1, B1 is pressurized by the wing portions 35 and hence, the oil attempts to flow into the pressure reducing chambers A2, B2 from the pressure increasing chambers A1, B1 through the communication passages 52a. Along with such an operation, the valve element 40' also moves to the pressure-reducing-chamber-side end portion of the valve element accommodating chamber whereby the communication passages 52a are closed by the valve elements 40' as shown in FIG. 4. Here, although the valve element 40' is pushed to a wall surface of the end portion of the valve element accommodating chamber due to a pushing force which the valve element 40' receives from the oil, since the contact surface is formed in the inclined surface with respect to the moving direction as mentioned previously, component forces of the pushing force act so as to make the valve element 40' function to separate the rotary shaft 30 and the rotary body 50 from each other toward the axial direction of the rotary shaft 30. Accordingly, even when some play in the axial direction is present after assembling due to the manufacturing irregularities in sizes of relevant portions of the cylinder 20, the rotary shaft 30 and the rotary body 50, the gap between the rotary shaft 30 and the bottom portion of the cylinder 20 is eliminated. Accordingly, the oil in the inside of the pressure increasing chambers A1, B1 flows into the pressure reducing chambers A2, B2 only through movement restricting flow passages which are formed between the wing portions 35 and the cylinder 20 and a given braking force is applied to the rotary shaft 30 due to the resistance which is generated due to such an oil flow.

On the other hand, when the rotary shaft 30 is rotated toward backwardly (in the direction opposite to the direction indicated by the arrow R in FIG. 1 and FIG. 3), opposite to the above-mentioned case, the oil flows into the pressure increasing chambers A1, B1 from the pressure reducing chambers A2, B2 through the communication passages 52a. Although the valve element 40' moves toward the pressure-increasing-chamber-side end portion along with such an operation, as shown in FIG. 5, the communication passage 52a is not closed and is held in the released state. Accordingly, the oil smoothly flows into the pressure increasing chambers A1, B1 from the pressure reducing chambers A2, B2 through the communication passages 52a. In this case, since the resistance is small, the substantially no braking force is applied to the rotary shaft 30.

In this manner, the damper device 1 has one-way function in which when the rotary shaft 30 is rotated toward one side, the check valves 40 are operated and hence, the proper braking force is applied to the rotary shaft 30, while when the rotary shaft 30 is rotated toward another side, the check valves 40 are not operated and hence, the braking force is hardly applied to the rotary shaft 30.

Due to such a constitution, in the damper device 1 of this embodiment, since the communication passages 52a and the checks valve 40 which give the one-way function to the damper device 1 are arranged between the rotary shaft 30 and the rotary body 50 which are integrally rotated, the valve elements 40' are merely brought into contact with and are separated from the wall surfaces of the communication passages 52a along with the rotation of the rotary shaft 30 whereby there is no possibility that the valve elements 40' slide in a state that the valve elements 40' are pushed to other members. Accordingly, there is no possibility that the valve elements 40' are worn and hence, the valve elements 40' can seal the flow passages while always maintaining a constant contact state whereby the durability of the damper device 1 can be enhanced. Further, according to the damper device 1 of this embodiment, since the mounting of the valve elements 40' can be completed by merely putting the valve elements 40' into the valve element accommodating chamber, it is possible to simplify the constitution of the check valves 40 thus facilitating the manufacture of the damper device 1 and, at the same time, the manufacturing cost of the damper device 1 can be lowered.

Next, the function of the bypass flow passage formed in the rotary body 50 is explained. As shown in FIG. 6, the bypass flow passage is constituted of bypass grooves 55, 55 which are shallowly formed in the rotary body 50 and an O-ring groove 53 which accommodates an O-ring 59 for forming the oil chamber by sealing the oil, wherein the bypass grooves 55, 55 are communicated with the O-ring groove 53. Then, the O-ring 59 is fitted on the O-ring groove 53. At the time of performing the usual operation, the O-ring groove 53 is closed by the O-ring 59. On the other hand, when the inner pressure of the front-side oil chambers (pressure increasing chambers A1, B1) is elevated than a value at the time of performing the usual operation, the O-ring 59 is further deformed due to the inner pressure and hence, the bypass grooves 55, 55 are communicated with each other through the O-ring groove 53 thus forming the bypass flow passage for allowing the oil to flow toward the rear-side oil chamber from the front-side oil chamber in the vicinity of the wing portion 35. In this manner, in the bypass flow passage, there is provided the resilient flow passage member which is resiliently deformed to increase a cross-sectional area of the flow passage when the inner pressure of the oil is elevated.

Accordingly, when the inner pressure of the front-side oil chamber is sharply increased along with the sharp rotation of the rotary shaft 30 as in the case of the forcible closing of a toilet lid, not only through the above-mentioned movement restricting flow passage described previously, a portion of the oil flows into the rear-side oil chamber from the front-side oil chamber also through the bypass flow passage corresponding to the inner pressure so as to lower the elevated inner pressure. Accordingly, it is possible to preliminarily prevent the rupture of the damper device such as the leaking of oil caused by the elevation of the inner pressure of the front-side oil chamber.

Particularly, since the bypass flow passage is formed by the resilient deformation of the O-ring 59 which seals the oil chamber, it is unnecessary to provide a dedicated member for forming the bypass flow passage whereby the number of parts which constitute the damper device 1 can be reduced thus facilitating the manufacture of the damper device 1 and, at the same time, reducing the manufacturing cost of the damper device 1.

Next, the function of the air bleeding groove 25 formed in the cylinder 20 is explained. The damper device 1 can be assembled as follows. That is, after mounting the rotary shaft 30 in the cylinder 20, the oil is filled in the inner space. Thereafter, the rotary body 50 is mounted in the cylinder 20. Here, there may be a case that air is mixed between the rotary body 50 and an oil surface and remains therebetween. This residual air can be smoothly taken out through the air bleeding groove 25. With the use of the air bleeding groove 25, it is possible to take out the air which remains in the oil chamber at the time of assembling the damper device 1 and hence, it is possible to prevent the generation of irregularities with respect to the braking force of the damper device 1 attributed to the mixing of the residual air in the oil at the time of operating the damper device 1 whereby the damper device 1 can obtain the stable quality and characteristics.

As has been explained heretofore, according to the damper device 1 of this embodiment, the check valves 40 are formed in the communication passages 52a which are formed between the side wall of the oil chamber of the cylinder 20 and the wing portions 35 of the rotary shaft 30 and hence, it is possible to manufacture the damper device 1 by sequentially assembling the rotary shaft 30 and the check valves 40 into the cylinder 20 whereby the manufacture of the damper device 1 is facilitated and the manufacturing cost can be reduced.

Particularly, since the side wall of the oil chamber is formed of the rotary body 50 which is integrally rotated with the rotary shaft 30, it is possible to form the check valves 40 between the rotary shaft 30 and the rotary body 50 which are integrally rotated whereby the check valves 40 are not brought into contact with the inner peripheral wall of the cylinder 20. Accordingly, even when the damper device 1 is used for a long period, there is no possibility that the check valves 40 are worn and the gap is formed between the check valves 40 and the inner peripheral wall of the cylinder 1 and hence, the lifetime of the damper device 1 can be prolonged.

Further, the rotary body 50 is arranged movably in the axial direction on the rotary shaft 30 and the contacting/separating portions of the check valves 40 are formed in the inclined surface with respect to the axial direction. Accordingly, by separating the rotary body 50 and the rotary shaft 30 from each other in the axial direction at the time of operating the damper device 1, it is possible to prevent the formation of the undesired oil flow passage whereby the manufacturing errors (size irregularities) of the rotary shaft 30 can be absorbed and hence, the damper device 1 can obtain the stable quality and characteristics.

Further, the check valve 40 is constituted such that the valve element 40' is movably arranged in the valve element accommodating chamber (valve accommodating recessed Original portions 33, 52) which is formed in the middle portion of the communication passage 52a and the communication passage 52a is opened and closed due to the movement of the valve element 40'. Accordingly, it is possible to hold the valve element 40' in the valve element accommodating chamber and hence, it is possible to stabilize the quality and the characteristics of the damper device 1 and, at the same time, to simplify the constitution of the check valve 40 whereby the manufacturing operation of the damper device 1 can be facilitated and the manufacturing cost of the damper device 1 can be lowered.

Still further, the valve element 40' increases the symmetry of the shape thereof by forming the valve element 40' into a columnar shape and hence, it is unnecessary to consider the assembling direction at the time of assembling and hence, the manufacturing cost of the damper device 1 can be lowered.

Second Embodiment

Figure 8:
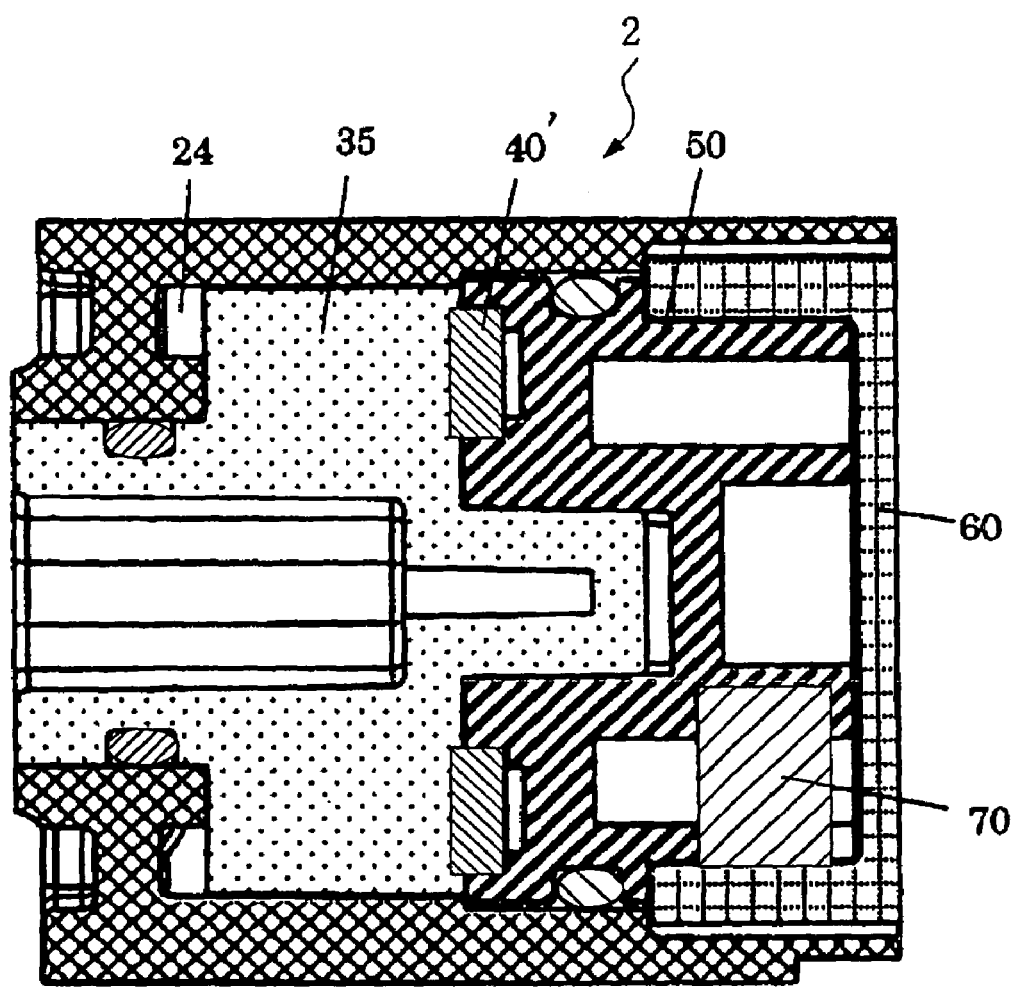
FIG. 8 is a cross-sectional view showing a damper device according to the second embodiment.
Figure 9:
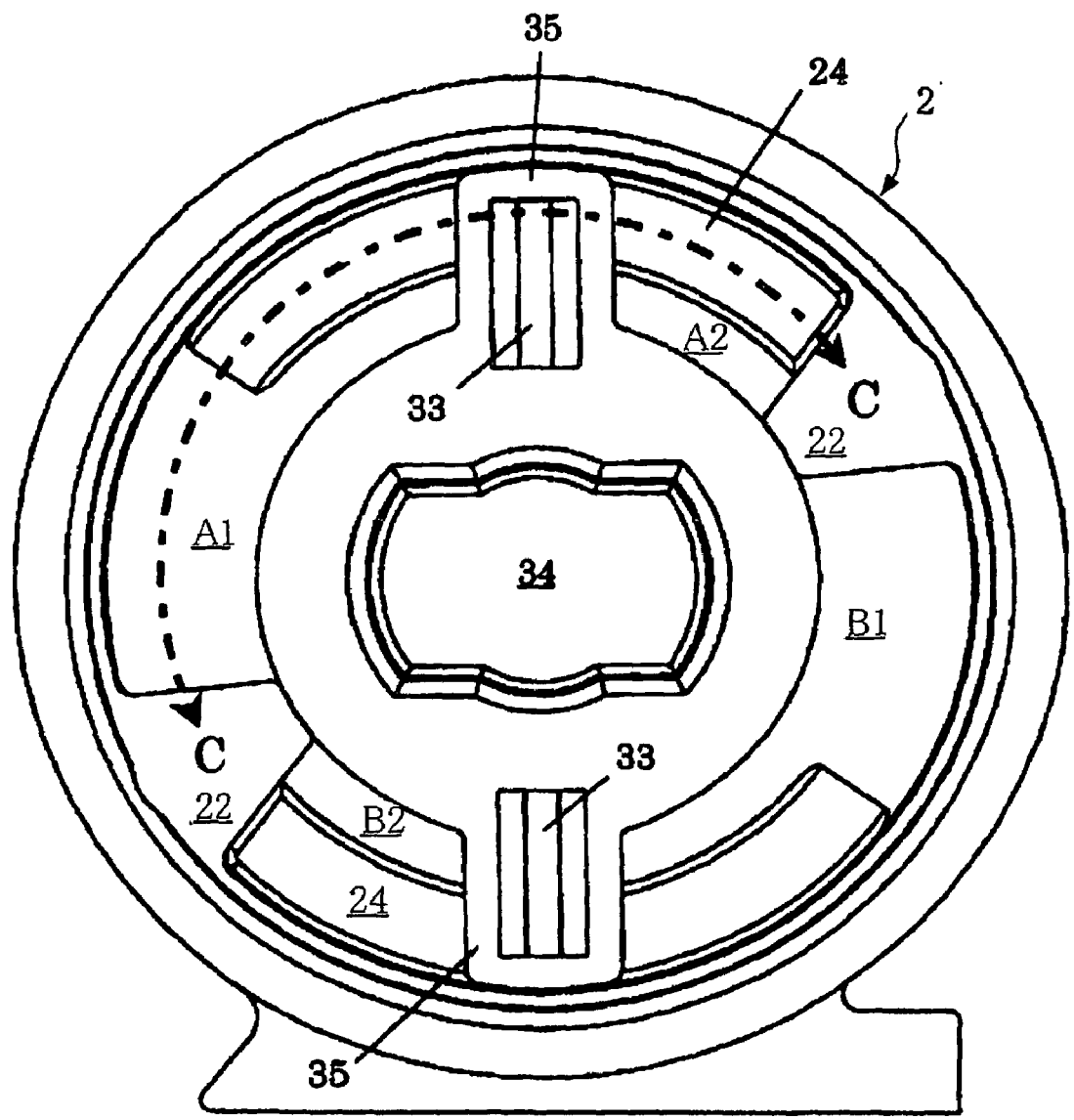
FIG. 9 is a side view showing a cylinder and a rotary shaft of the damper device according to the second embodiment.

A damper device 2 of the second embodiment has, as shown in FIG. 7 and FIG. 8, the substantially equal constitution as the damper device 1 of the first embodiment. However, this embodiment differs from the first embodiment with respect to a point that a speed adjusting flow passage 24 is formed between the side wall of the cylinder 20 and the wing portion 35. Here, to simplify the explanation, members having the identical functions as the members of the first embodiment are given same symbols and the specific explanation of the portions which have been already explained in conjunction with the first embodiment is omitted.

The speed adjusting flow passage 24 is provided for allowing the front-side oil chamber (pressure increasing chamber A1, B1) and the rear-side oil chamber (pressure reducing chamber A2, B2) to communicate with each other between the front-side oil chamber and the rear-side oil chamber and the wing portions 35. That is, the speed adjusting flow passage 24 is provided for setting the rotating speed of the rotary shaft 30 to a given speed by changing a flow rate of the oil which moves between the front-side oil chamber and the rear-side oil chamber in response to a rotational angle of the rotary shaft 30 thus adjusting the braking force applied to the rotary shaft 30. Although a cross-sectional area of the flow passage is decreased corresponding to the increase of the rotational angle of the rotary shaft 30 in this embodiment, it is possible to obtain various operational speeds by setting the cross-sectional area of the flow passage arbitrary to an arbitrary value depending on the application.

In this manner, by forming the speed adjusting flow passage 24 separately from the communication passage 52*a*, at the time of rotating the rotary shaft 30 of the damper device 2, even when the communication passage 52*a* is closed by the check valve 40, the oil flows into the rear-side oil chamber from the front-side oil chamber through two oil flow passages consisting of the above-mentioned movement restricting flow passage and speed adjusting flow passage 24. Accordingly, the braking force applied to the rotary shaft 30 becomes proportional to the flow passage resistance which is obtained by combining the flow passage resistances of these two oil passages and becomes a value corresponding to the cross-sectional areas of both oil passages.

The speed adjusting flow passage 24 is relatively deeply formed in a range where the rotational angle of the rotary shaft 30 is small and is relatively shallowly formed in a range where the rotational angle of the rotary shaft 30 is large. Accordingly, the braking force applied to the rotary shaft 30 is made small within a range where the rotational angle of the rotary shaft 30 is small so as to allow the relatively fast rotation of the rotary shaft 30, while the braking force applied to the rotary shaft 30 is made large within a range where the rotational angle of the rotary shaft 30 is large so as to allow the relatively slow rotation of the rotary shaft 30.

Figure 10:
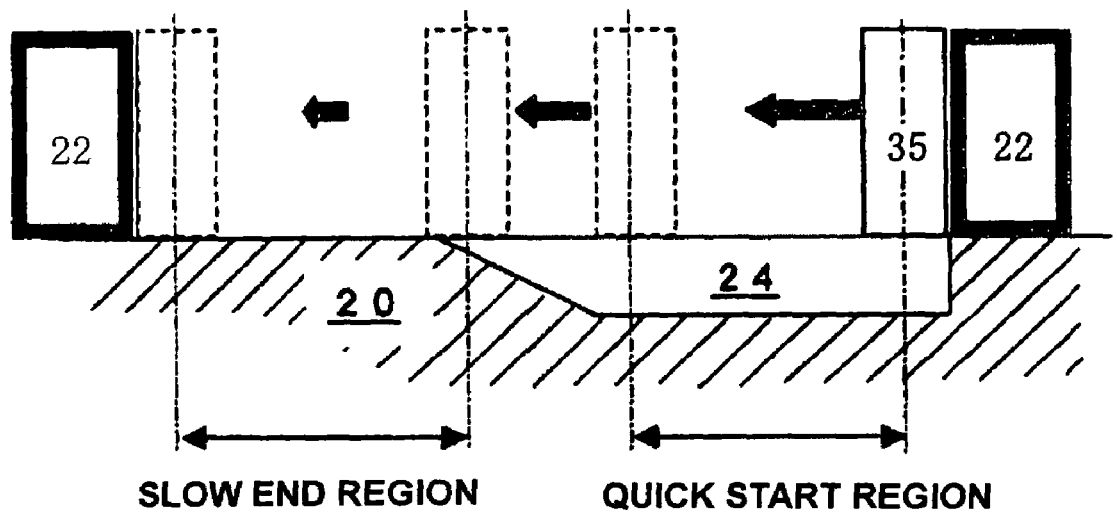
FIG. 10 is a schematic view showing an oil flow passage of the damper device according to the second embodiment.

To be more specific, the speed adjusting flow passage 24 is, as schematically shown in FIG. 10, formed deeply with a constant thickness such that the speed adjusting flow passage 24 exhibits the sufficiently large cross-sectional area compared to the cross-sectional area of the movement restricting flow passage within a range of 40 degrees from a proximal end of the partition wall 22 (the rotational angle of the rotary shaft 30 being with in a range of 0 to 40 degrees). On the other hand, within a range of 40 degrees to 90 degrees, the speed adjusting flow passage 24 is formed such that speed adjusting flow passage 24 becomes gradually shallow, and the speed adjusting flow passage 24 is not formed within a range of 90 degrees to 120 degrees. Here, in this embodiment, a circumferential angle between two partition walls 22 is set to 120 degrees so as to allow the rotary shaft 30 to be rotated by 120 degrees.

Accordingly, when the rotational angle of the rotary shaft 30 falls within a range of 0 to 40 degrees, the most of oil flows into the rear-side oil chamber from the front-side oil chamber through the speed adjusting flow passage 24 which exhibits the extremely small flow resistance compared to the movement restricting flow passage. Accordingly, a force which suppresses the flow of the oil with the movement restricting flow passage is relatively weakened and hence, the braking force hardly acts on the rotary shaft 30 whereby the rotary shaft 30 is rotated relatively fast. Here, the region in which the rotary shaft 30 is rotated relatively fast (the rotational angle of the rotary shaft 30 being within 0 to 40 degrees) is referred to as the quick start region.

Further, when the rotational angle of the rotary shaft 30 falls within a range of 40 to 90 degrees, an amount of oil which flows into the rear-side oil chamber from the front-side oil chamber through the speed adjusting flow passage 24 is gradually reduced. Accordingly, a contribution rate of braking force attributed to the movement restricting flow passage is gradually increased and hence, the braking force which acts on the rotary shaft 30 is gradually increased whereby the rotational speed of the rotary shaft 30 becomes gradually slow.

Still further, when the rotational angle of the rotary shaft 30 falls within a range of 90 to 120 degrees, substantially no oil flows into the rear-side oil chamber from the front-side oil chamber through the speed adjusting flow passage 24. Accordingly, a force which suppresses the flow of the oil with the movement restricting flow passage is relatively increased and hence, the braking force which acts on the rotary shaft 30 becomes large whereby the rotary shaft 30 is rotated relatively slow. Here, the region in which the rotary shaft 30 is rotated relatively slow (the rotational angle of the rotary shaft 30 being within 90 to 120 degrees) is referred to as the slow end region.

In this manner, according to the damper device 2 of this embodiment, the speed adjusting flow passage 24 is formed deeply within the range in which the rotational angle of the rotary shaft 30 is small and, at the same time, the speed adjusting flow passage 24 is formed shallowly within the range in which the rotational angle of the rotary shaft 30 is large. Accordingly, at the starting time when the rotational angle of the rotary shaft 30 is small, the rotary shaft 30 is rotated fast and, at the same time, at the finishing time when the rotational angle of the rotary shaft 30 is large, the rotary shaft 30 is rotated slowly whereby it is possible to alleviate an impact at the finishing time while shortening the time necessary for rotation.

Figure 11:
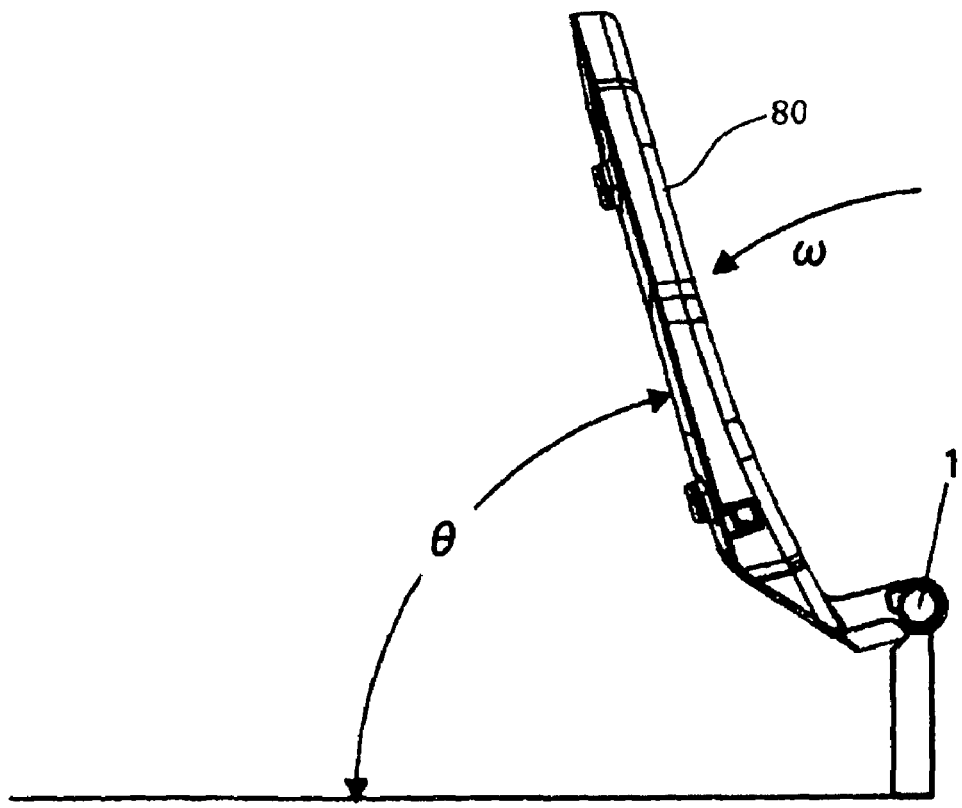
FIG. 11 is a side view showing a state in which the damper device according to the second embodiment is mounted on a toilet seat.
Figure 12:
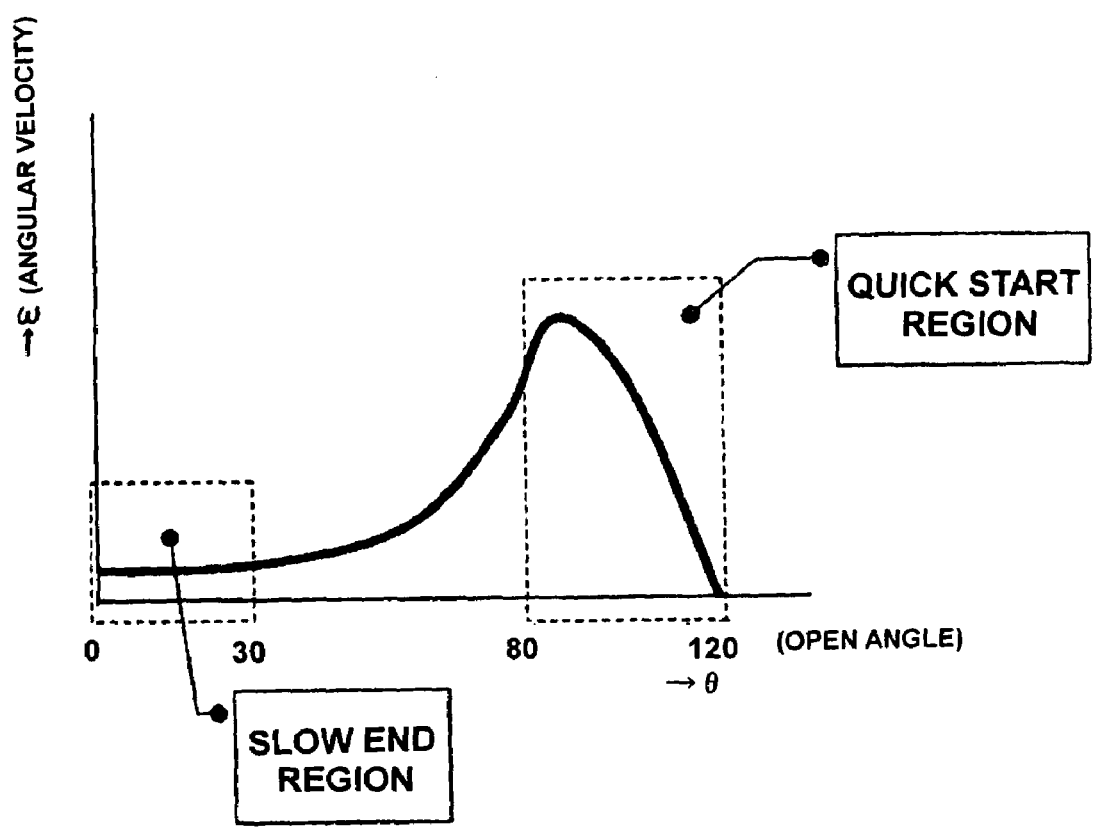
FIG. 12 is a graph showing the relationship between a rotational angle and an angular velocity of the toilet seat.

When this damper device 2 is incorporated into an open/close portion of a toilet seat 80 of a toilet as shown in FIG. 11, the relationship between an open angle θ and an angular velocity ω of the toilet seat 80 is set as shown in FIG. 12. That is, in the quick region of the damper device 2 (the open angle θ of toilet seat 80 being within a range of 120 to 80 degrees), the angular velocity ω of the toilet seat 80 is gradually increased. Thereafter (the open angle θ of the toilet seat 80 being within a range of 80 to 30 degrees), the angular velocity ω of the toilet seat 80 becomes gradually slow. Further, in the slow end region of the damper device 2 (the open angle θ of the toilet seat 80 being within a range of 30 to 0 degrees), the angular velocity ω of the toilet seat 80 becomes gradually slow. Here, as shown in FIG. 11, the open angle θ of the toilet seat 80 indicates a rotational angle of the toilet seat 80 started from a starting point which is a state that the toilet seat 80 is closed.

Here, the ranges of the quick start region and the slow end region can be suitably set corresponding to a device in which the damper device 2 is incorporated.

As has been explained above, according to this embodiment, since the speed adjusting flow passage 24 is formed in the bottom wall of the cylinder 20, it is unnecessary to provide a dedicated member for forming the speed adjusting flow passage 24. Accordingly, the number of parts which constitute the damper device 2 can be decreased and hence, the manufacture of the damper device 2 is facilitated and, at the same time, the manufacturing cost of the damper device 2 can be reduced.

Third Embodiment

Figure 13:
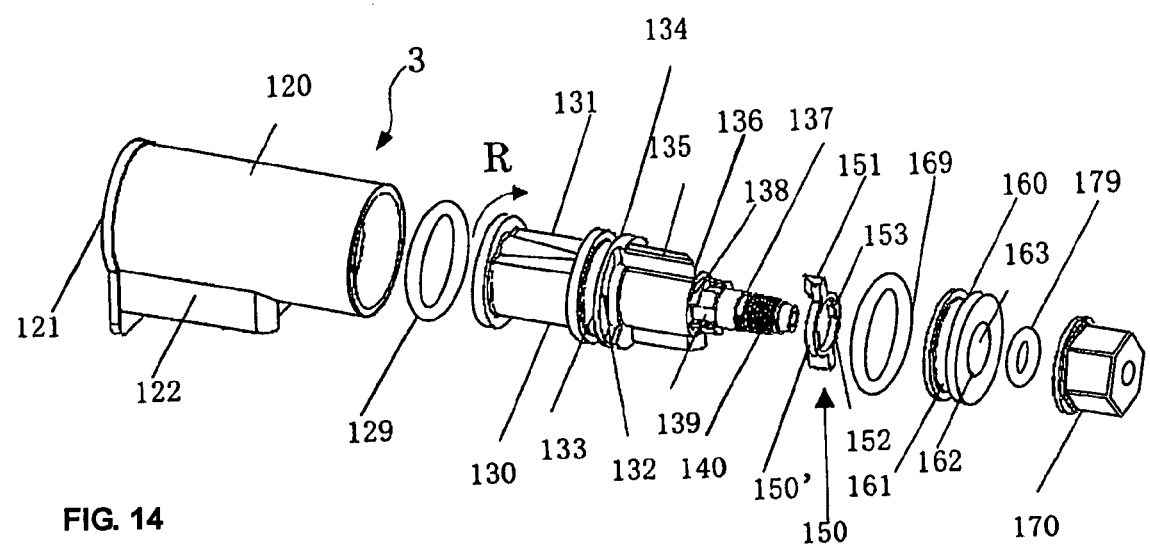
FIG. 13 is an exploded perspective view showing a damper device according to the third embodiment.

The damper device 3 according to the third embodiment includes, as shown in FIG. 13, a cylinder 120, a rotary shaft 130, check valves 140, a rotary body 150 and a nut 170. In the drawing, numerals 129, 169, 179 indicate O-rings which are provided for sealing the inside of the cylinder 120.

Figure 14:
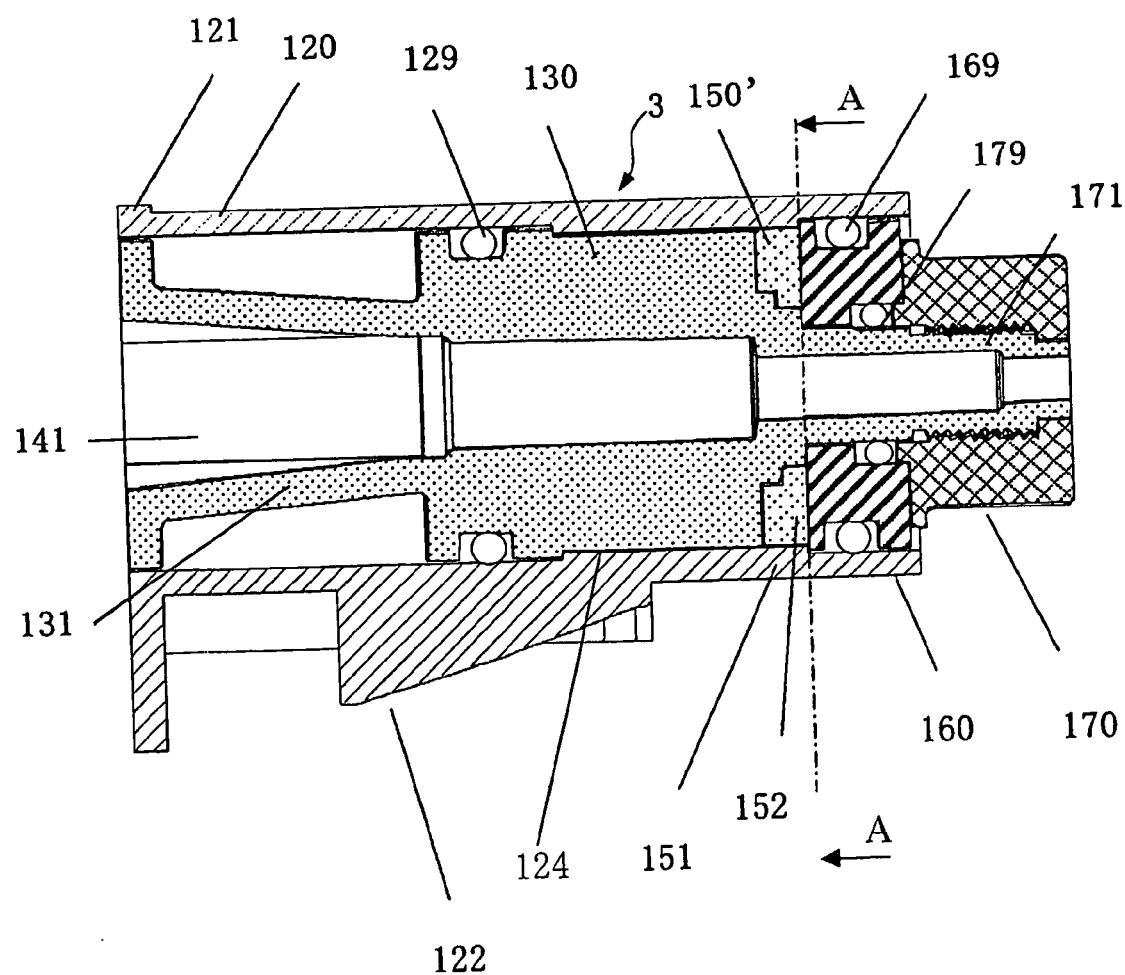
FIG. 14 is a cross-sectional view showing the damper device according to the third embodiment.

The cylinder 120 is formed in a tubular shape having a hollow portion. As shown in FIG. 14, on a middle portion of an inner peripheral surface of the cylinder 120, for rotatably supporting the rotary shaft 130, a narrow-diametered portion 124 which forms a cylindrical surface having an inner diameter slightly smaller than an inner diameter of both end portions is formed. A mounting seat portion 122 is formed on an outer peripheral bottom portion. Further, as shown in FIG. 15, the cylinder 120 forms a pair of partition walls 123, 123 on a bottom-portion-side of an inner wall within a range of the narrow-diametered portion 124 in a state that the pair of partition walls 123,123 face each other.

Figure 22:
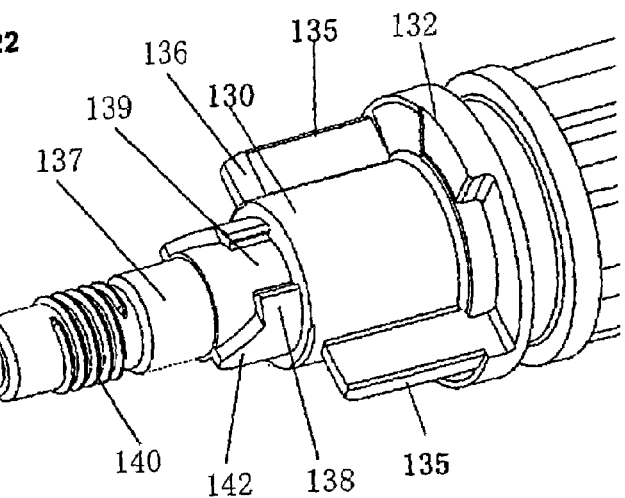
FIG. 22 is a perspective view showing the rotary shaft of the damper device according to the third embodiment.

The rotary shaft 130 forms an output shaft 131 on a proximal end side (a left end side in FIG. 13 and FIG. 14) thereof, wherein the output shaft 131 includes a connecting hole 141 to which an open/close shaft of a toilet seat or a toilet lid is connected in a center portion thereof. A columnar portion 134 which constitutes a side wall of an oil chamber is formed on an outer periphery of a middle portion of the rotary shaft 130, while an O-ring groove 133 which allows an O-ring 129 to be fitted therein is formed on an outer periphery of the columnar portion 134. Further, as shown in FIG. 22, a pair of wing portions 135, 135 are formed on the outer periphery of the middle portion of the rotary shaft 130 in a state that the wing portions 135, 135 project in the radial direction and face each other in an opposed manner. An oblique wing end portion 136 is formed on a distal end portion (a right end portion in FIG. 13 and FIG. 14) of each wing portion 135. The wing portions 135 divide the hollow portion of the cylinder 120 in two, that is, front-side oil chambers (pressure increasing chambers A101, B101) which are formed on a front side with respect to the rotational direction of the rotary shaft 130 and rear-side oil chambers (pressure reducing chambers A102, B102) which are formed on a rear side with respect to the rotational direction of the rotary shaft 130. Further, an approximately columnar connecting shaft 137 is formed on a distal end side (a right end side in FIG. 13 and FIG. 14) of the rotary shaft 130. On an outer periphery of the connecting shaft 137, a male thread portion 140 for allowing the thread engagement of the nut 170 and an engaging portion 142 which is engaged with the connecting shaft 137 to stop the rotation of the rotary body 160 are formed. Further, the rotary shaft 130 forms a valve element mounting shaft 138 on which a valve element 150' constituting a check valve 150 is mounted between the wing portions 135, 135 and the connecting shaft 137. A recessed portion 139 is formed in the valve element mounting shaft 138.

Figure 15:
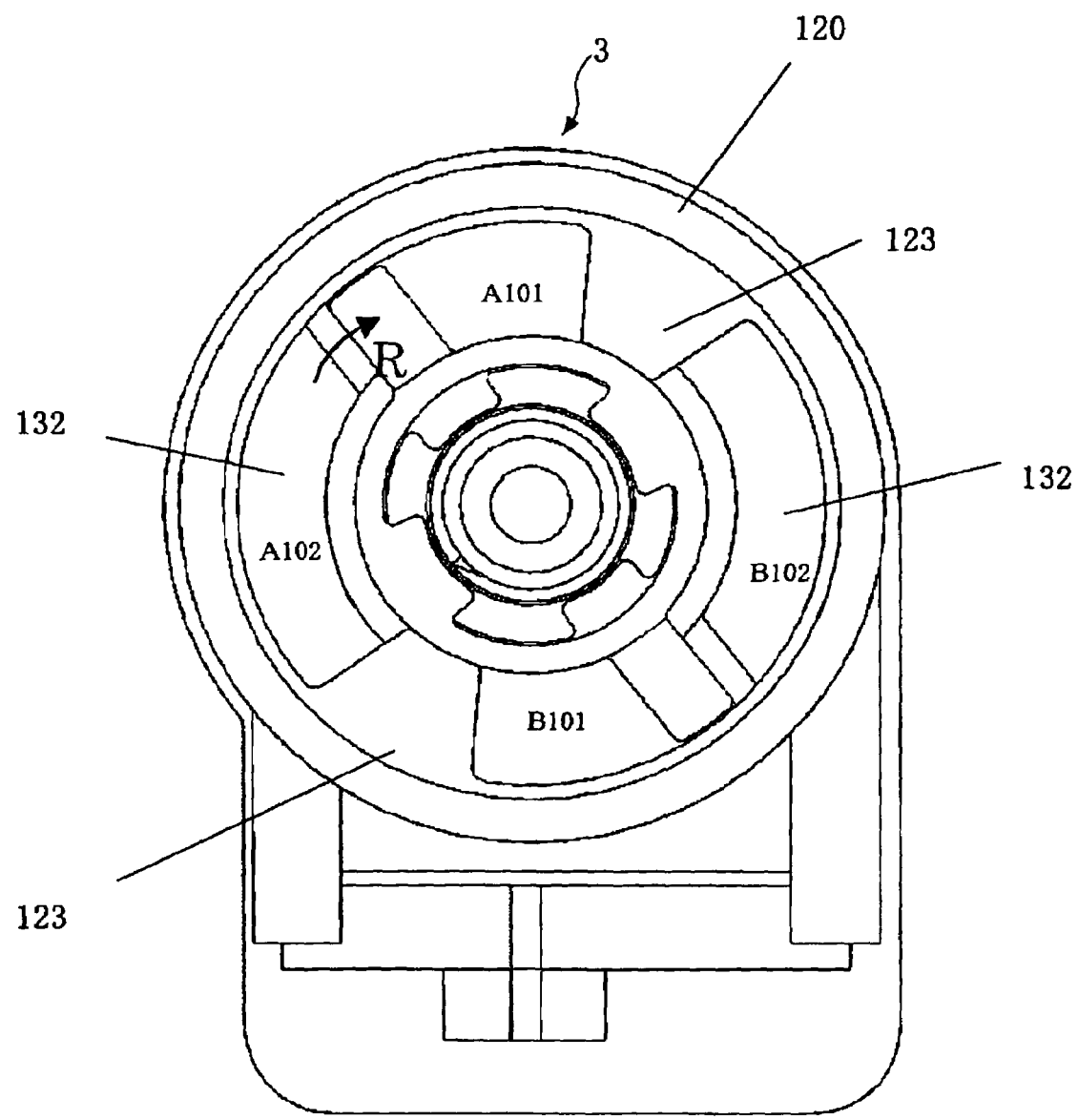
FIG. 15 is a side view showing a cylinder and a rotary shaft of the damper device according to the third embodiment.

Further, as shown in FIG. 15, an outer diameter of the wing portions 135 is set slightly smaller than the inner diameter of the narrow-diametered portion 124 of the cylinder 120 and hence, when the rotary shaft 130 is rotated in the inside of the cylinder 120, the wing portions 135 slide while maintaining a given fine gap between the wing portions 135 and the inner peripheral wall of the hollow portion of the cylinder 120. Then, this given fine gap restricts the movement of oil between the front-side oil chamber and the rear-side oil chamber and functions as a movement restricting flow passage which acts a braking force to the rotary shaft 130.

The rotary body 160 forms a through hole 163 which allows the insertion of the connecting shaft 137 of the rotary shaft 130 therethrough and, at the same time, forms an O-ring groove 161 in an outer periphery thereof for allowing an O-ring 169 to be fitted therein. Further, in an inner periphery of the through hole 163, an O-ring groove 162 for allowing an O-ring 179 to be fitted therein and an engaging portion which is engaged with the engaging portion 142 formed on the connecting shaft 137 are formed. Still further, the rotary body 160 functions as a lid for hermetically sealing the hollow portion of the cylinder 120 thus preventing the leaking of oil filled in the hollow portion of the cylinder 120 from the cylinder 120. An inner end surface of the rotary body 160 forms one side wall of the oil chamber formed in the inside of the cylinder 120. Another side wall of the oil chamber is formed of a distal end side (a right-end side shown in FIG. 13 and FIG. 14) of the columnar portion 134 of the rotary shaft 130.

In a center portion of the nut 170, a female thread portion 171 which is threadedly engaged with the male thread portion 140 formed on the connecting shaft 137 of the rotary shaft 130 is formed. Then, by allowing the nut 170 to be threadedly engaged with the male thread portion 140 of the connecting shaft 137, the rotary body 160 is fixed to the rotary shaft 130 in a state that the rotary body 160 is integrally rotated with the rotary shaft 130.

The damper device 3 is assembled in a state that the narrow-diametered portion 124 of the cylinder 120 is sandwiched by the columnar portion 134 of the rotary shaft 130 and the rotary body 160 and hence, the rotary shaft 130 and the rotary body 160 are rotatably arranged in the inside of the cylinder 120. Further, a gap which allows the front-side oil chamber and the rear-side oil chamber to communicate with each other is formed between a wind end portion 136 of the wing portion 135 of the rotary shaft 130 and the rotary body 160. By arranging the valve element 150' in the gap in a state that the valve element 150' is movable in the circumferential direction and the axial direction of the rotary shaft 130, the check valve 150 is formed. Accordingly, while this gap forms a communication passage 152a which becomes an oil flow passage when the oil moves to the rear-side oil chamber from the front-side oil chamber, the gap also functions as a selective communication passage which selectively restricts the movement of the oil in response to the rotational direction of the rotary shaft 130 using the check valve 150.

The valve element 150' is constituted of a ring portion 152 which is properly resiliently deformable and a pair of valve portions 151, 151 which are formed on the ring portion 152 in a state that the valve portions 151, 151 project in an opposed manner. The valve portions 151 form sealing surfaces 157 which are inclined in the oblique direction with respect to the rotational direction of the rotary shaft 130 on end portions thereof. Due to such a constitution, inclined surfaces which are inclined with respect to the moving direction of the valve elements 150' and the axial direction of the rotary shaft 130 are formed in closing portions defined by the wing portions 135 and the valve elements 150'. Here, in this embodiment, although the inclined surfaces are formed on both of the wing end portions 136 of the wing portions 135 and the valve portions 151 of the valve elements 150', the present invention is not limited to such a constitution. That is, the inclined surfaces may be formed on either one of the wing end portions 136 and the valve portions 151.

Figure 16:
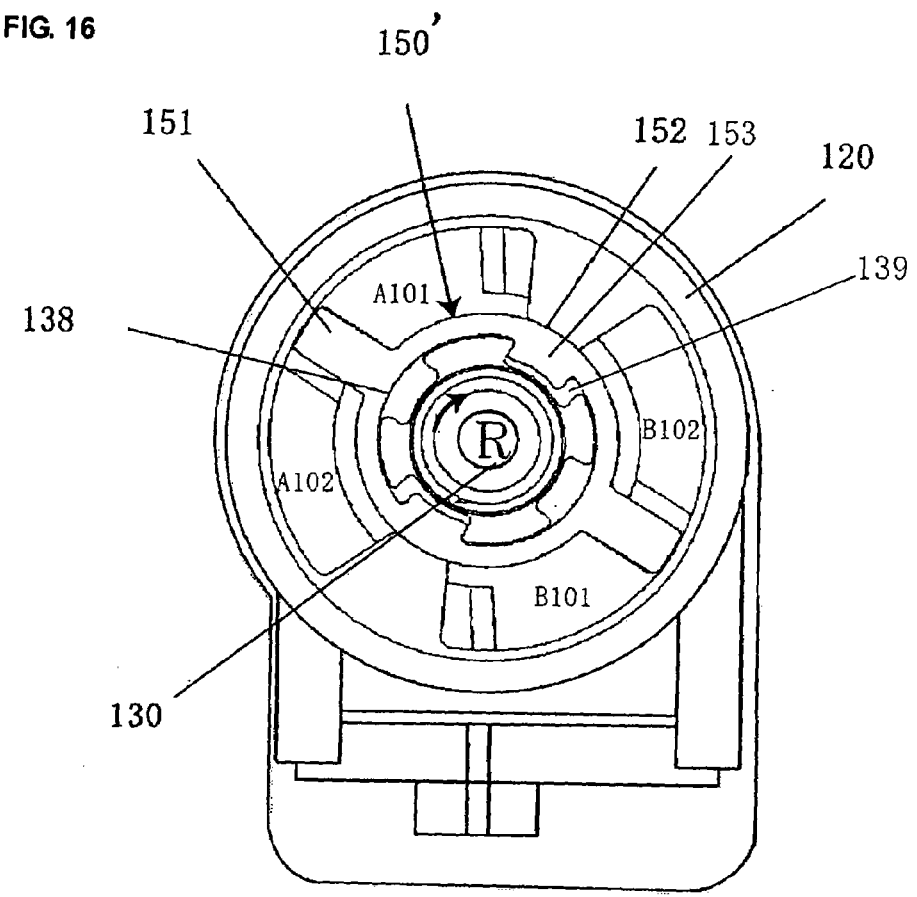
FIG. 16 is a side view showing a check valve (in a valve-closed state) of the damper device according to the third embodiment.

Further, as shown in FIG. 16, on an inner peripheral portion of a ring portion 152 of the valve element 150', projecting portions 153 which are engaged with recessed portions 139 formed on the valve element mounting shaft 138 are formed. The valve element 150' is configured to be rotated in the circumferential direction of the rotary shaft 130 within a range that the projecting portions 153 are brought into contact with the recessed portions 139. Due to such a constitution, even when the communication passages 152a are opened, the valve elements 150' can move only to proper positions and hence, the valve elements 150' can rapidly return to the closed position when the valve operation is shifted from the open state to the closing operation and the braking force rapidly acts on the rotary shaft 130.

Figure 17:
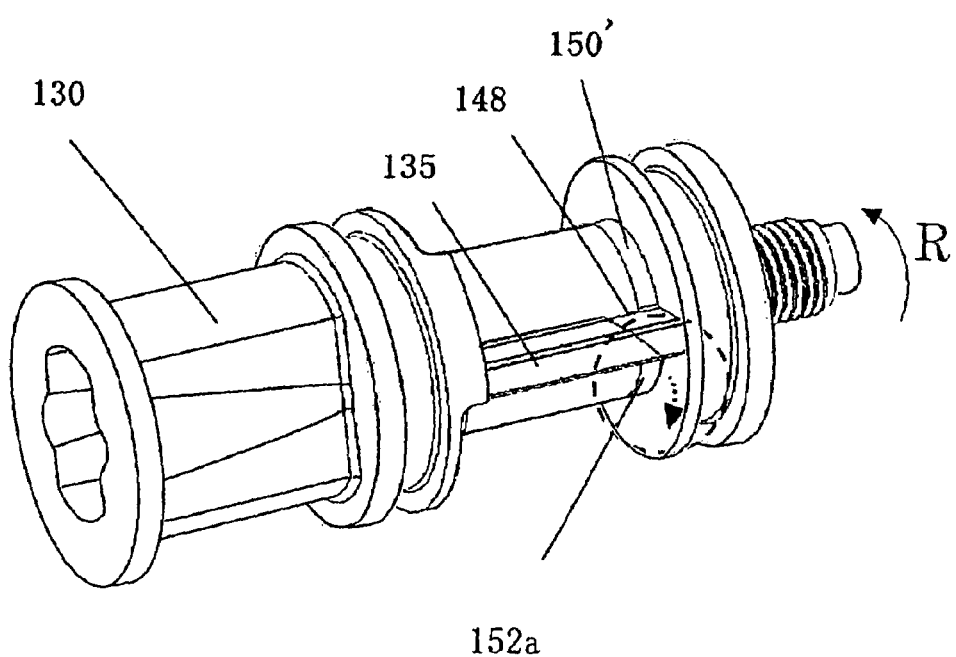
FIG. 17 is a perspective view showing a check valve (in a valve-closed state) of the damper device according to the third embodiment.
Figure 19:
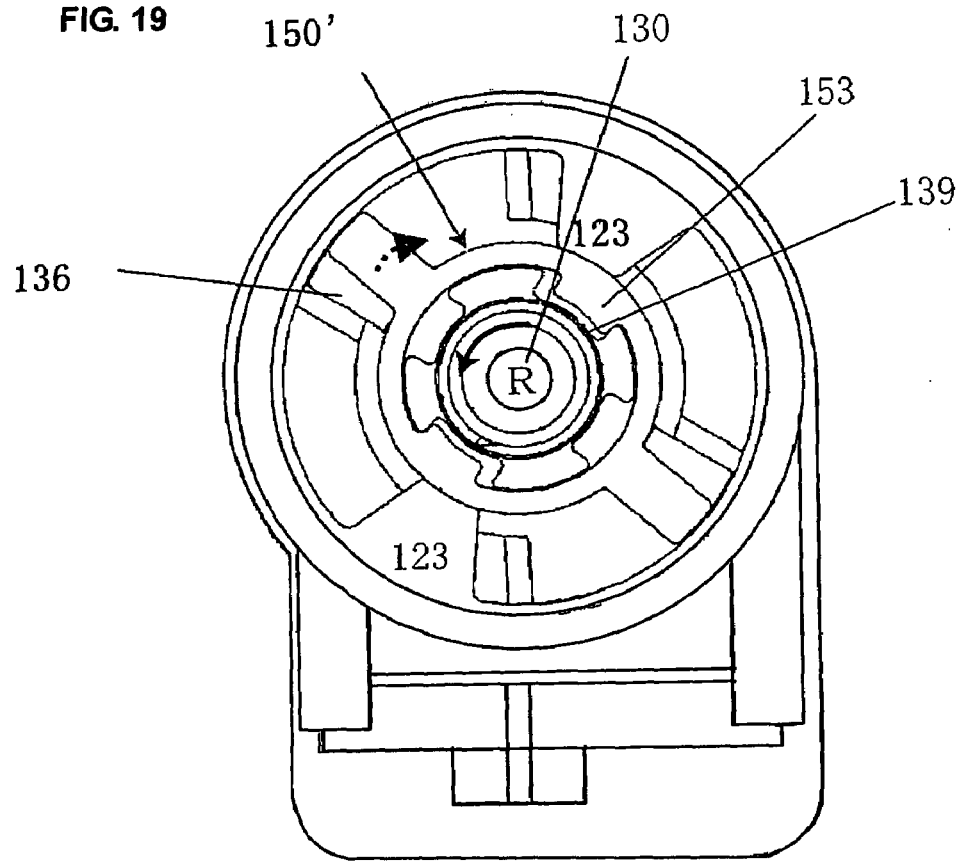
FIG. 19 is a side view showing a check valve (in a valve-opened state) of the damper device according to the third embodiment.
Figure 20:
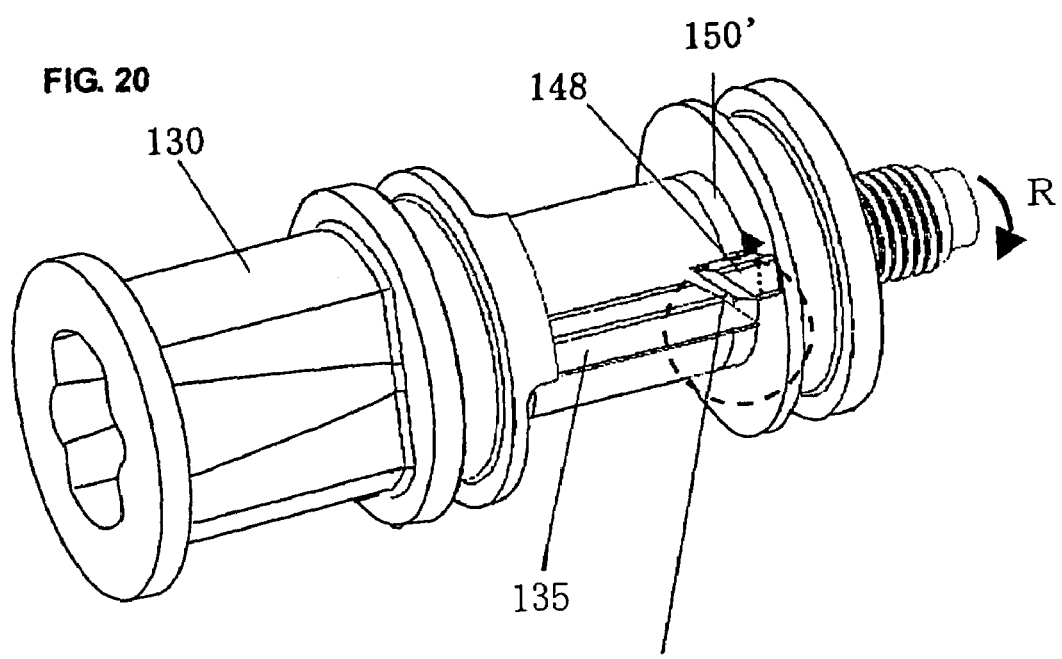
FIG. 20 is a perspective view showing a check valve (in a valve-opened state) of the damper device according to the third embodiment.

Then, with respect to the check valve 150, as shown in FIG. 16 and FIG. 17, when the valve portion 151 of the valve element 150' and the wing end portion 136 of the wing portion 135 of the rotary shaft 130 are brought into contact with each other, the communication passage 152a is closed by the valve portion 151 and hence, the oil cannot flow from the pressure increasing chamber A101 to the pressure reducing chamber A102 through the communication passage 152a. On the other hand, as shown in FIG. 19 and FIG. 20, when the valve portion 151 of the valve element 150' and the wing end portion 136 of the wing portion 135 of the rotary shaft 130 are spaced apart from each other, the oil flows from the pressure increasing chamber A101 to the pressure reducing chamber A102 through the communication passage 152a.

Figure 18:
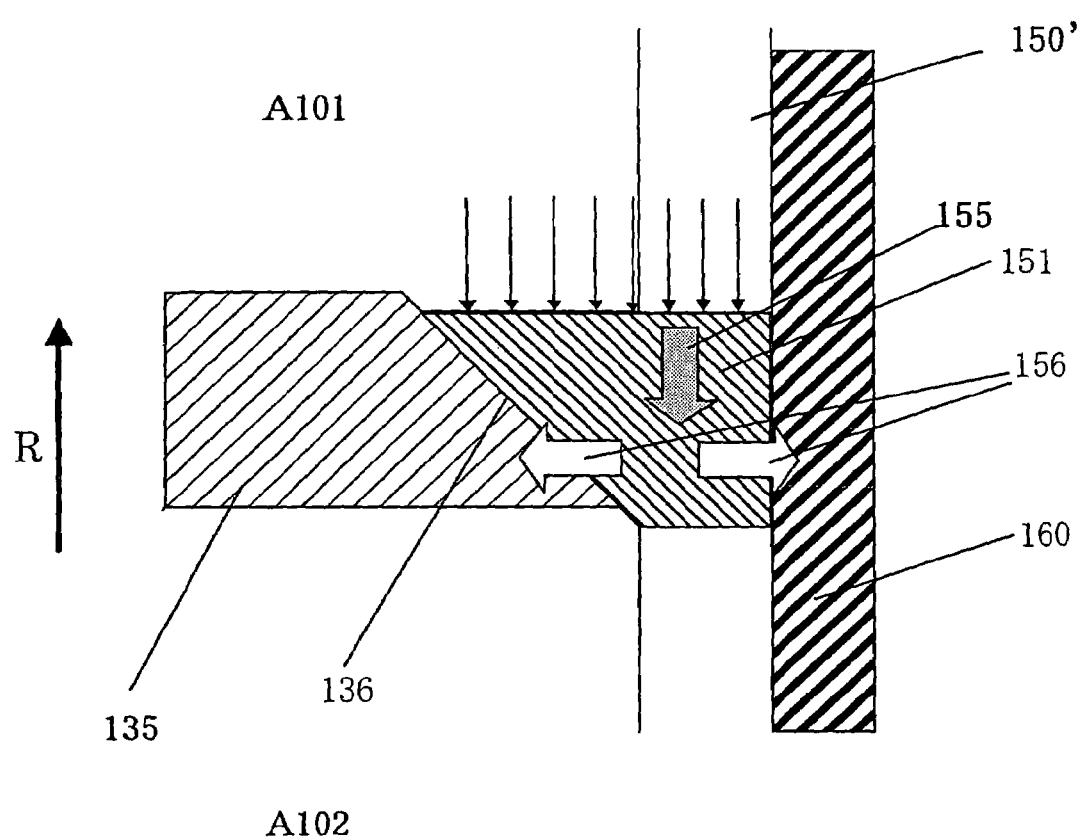
FIG. 18 is an enlarged view showing a check valve (in a valve-closed state) of the damper device according to the third embodiment.

When the rotary shaft 130 of the damper device 3 having the above-mentioned constitution is rotated in the forward direction (the direction indicated by an arrow R in FIG. 16), the oil in the inside of the pressure increasing chambers A101, B101 is pressurized by the wing portions 135 and the oil flows into the pressure reducing chambers A102, B102 from the pressure increasing chambers A101, B101 through the communication passages 152a. Along with such a flow of the oil, the valve portions 151 of the valve element 150' start to move in the direction approaching the wing end portions 136 of the wing portions 135 and, as shown in FIG. 17, the valve portions 151 and the wing end portions 136 are brought into contact with each other finally. Here, as shown in FIG. 18, upon receiving a force indicated by numeral 155 from the oil, the valve portions 151 continue the movement further also in the rotational direction while approaching in the direction of the rotary body 160 along the inclined wing end portions 136 formed on the wing portions 135 and are eventually stopped in a state that the valve portions 151 are pushed to the wing end portions 136 and the rotary body 160 due to a force in the direction indicated by numeral 156. Then, the communication passages 152a are completely closed by the valve elements 150'. Accordingly, the oil moves to the pressure reducing chambers A102, B102 from the pressure increasing chambers A101, B101 through the above-mentioned movement restricting flow passages and the speed adjusting flow passages 132 and hence, a given braking force acts on the rotary shaft 130.

Figure 21:
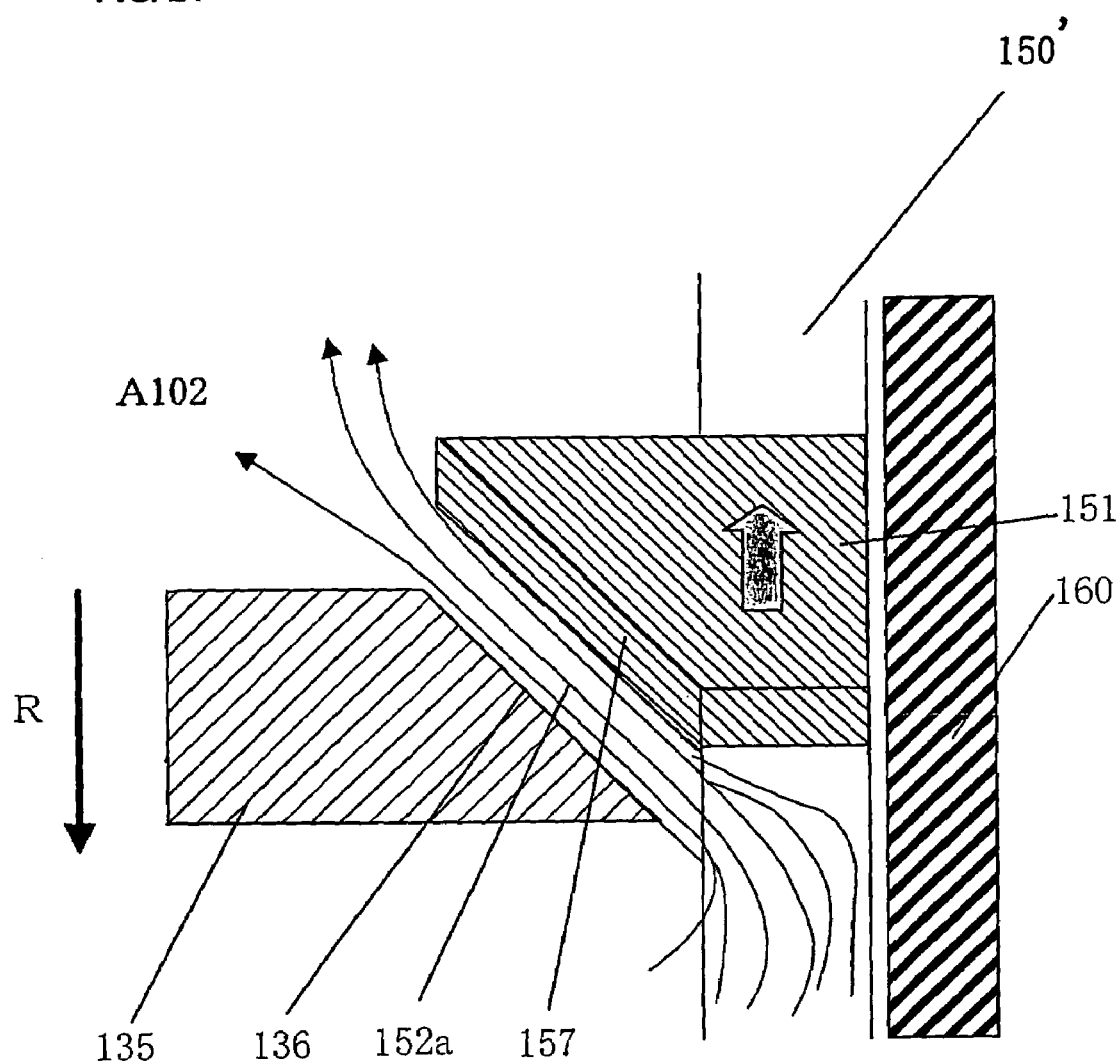
FIG. 21 is an enlarged view showing a check valve (in a valve-opened state) of the damper device according to the third embodiment.

On the other hand, when the rotary shaft 130 is rotated in the rearward direction (the direction indicated by an arrow R in FIG. 17), opposite to the above-mentioned case, the oil attempts to flow into the pressure increasing chambers A101, B101 from the pressure reducing chambers A102, B102 through the communication passages 152a. Along with such a flow of the oil, the valve elements 150' move in the direction away from the wing portions 135. Accordingly, as shown in FIG. 20 and FIG. 21, the communication passages 152a are open with a given distance and hence, the oil smoothly flows into the pressure increasing chambers A101, B101 from the pressure reducing chambers A102, B102 through the communication passages 152a. Here, since a flow-passage cross-sectional area of the communication passages 152a is set larger than a flow-passage cross-sectional area of other oil flow passages such as the movement restricting flow passages and the speed adjusting flow passages 132 and the like, substantially no braking force acts on the rotary shaft 130.

In this manner, with respect to the damper device 3, when the rotary shaft 130 is rotated toward one side, the communication passages 152a are closed by the check valves 150 and hence, the proper braking force attributed to the movement restricting flow passages and the speed adjusting flow passages 132 acts on the rotary shaft 130, while when the rotary shaft 130 is rotated toward another side, the communication passages 152a are opened by the check valves 150 and hence, substantially no braking force acts on the rotary shaft 130.

Further, in this embodiment, since the valve element 150' is constituted of the ring portion 152 which is loosely fitted on the rotary shaft 130 and the pair of valve portions formed on the ring portion 152 in a projecting manner, by merely mounting the ring portion 152 of the valve element 150' on the rotary shaft 130, it is possible to assemble the valve portions 151 of the check valve 150 on the rotary shaft 130 whereby it is possible to further facilitate the manufacturing operation of the damper device 3.

Still further, the damper device 3 includes the speed adjusting flow passages 132 which allow the front-side oil chambers (pressure increasing chambers A101, B101) and the rear-side oil chambers (pressure reducing chambers A102, B102) to communicate with each other between the front-side oil chambers and the rear-side oil chambers and the wing portions in the same manner as the damper device 2 of the above-mentioned second embodiment.

The speed adjusting flow passages 132 are provided between the side wall of the oil chamber and the wing portions 135 for allowing the front-side oil chambers (pressure increasing chambers A101, B101) and the rear-side oil chambers (pressure reducing chambers A102, B102) to communicate with each other between the front-side oil chambers and the rear-side oil chambers. That is, the speed adjusting flow passages 132 are oil flow passages which are provided for adjusting the rotating speed of the rotary shaft 130 by changing a flow rate of the oil in response to a rotational angle of the rotary shaft 130. Although a cross-sectional area of the flow passage is decreased corresponding to the increase of the rotational angle of the rotary shaft 130 and, at the same time, a cross-sectional area of the flow passage on the rotation finishing end side of the rotary shaft 130 is decreased in a step-like manner in this embodiment, it is possible to obtain various operational speeds by setting the cross-sectional area of the flow passage to an arbitrary value depending on the application.

In this manner, by forming the oil flow passages which allow the oil to flow therethrough separately from the communication passages 152a, at the time of rotating the rotary shaft 130 of the damper device 3, even when the communication passages 52a are closed by the check valves 150, the oil flows into the rear-side oil chambers from the front-side oil chambers through two oil flow passages consisting of the above-mentioned movement restricting flow passage and speed adjusting flow passage 132. Accordingly, the braking force applied to the rotary shaft 130 becomes proportional to the flow passage resistance which is obtained by combining the flow passage resistances of these two oil passages and becomes a value corresponding to the cross-sectional areas of both oil passages.

Figure 28:
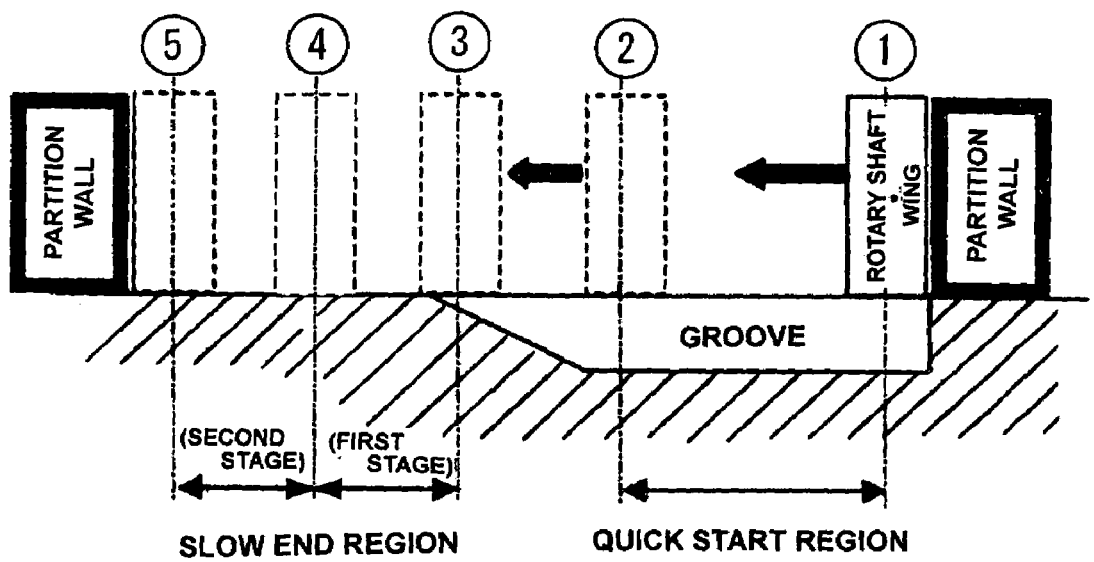
FIG. 28 is a schematic view showing an oil flow passage of the damper device.
Figure 29A:
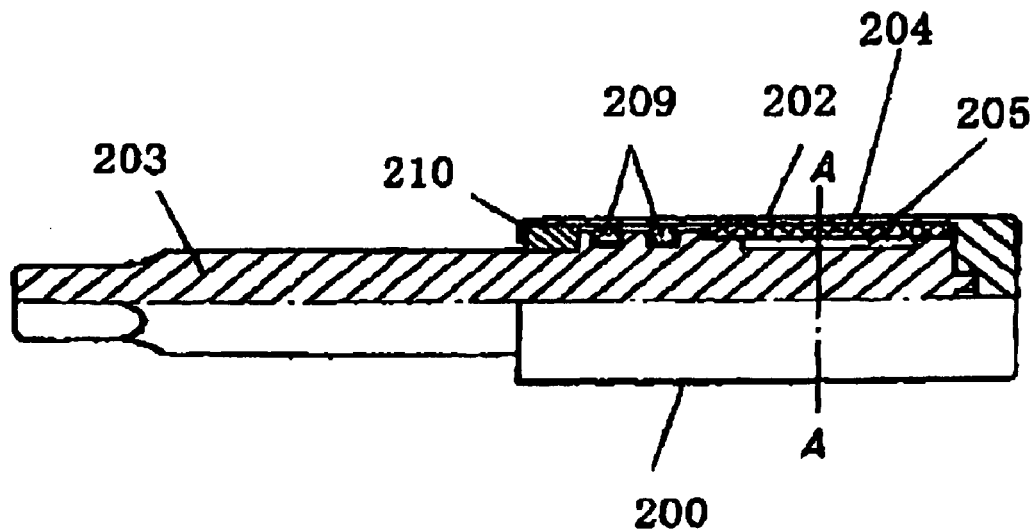
FIG. 29(a) is a side view showing a conventional damper device and FIG. 29(b) is a cross-sectional view taken along a line A-A in FIG. 29(a).
Figure 29B:
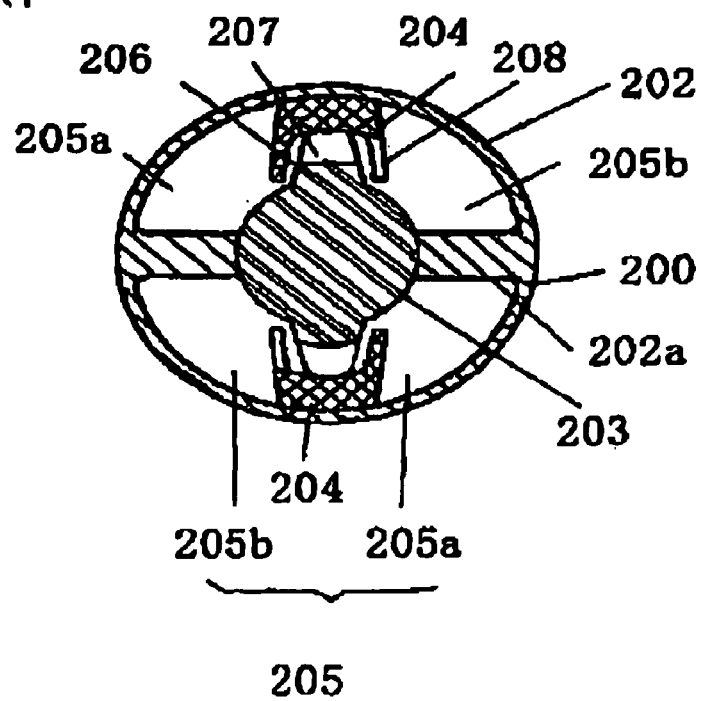
Figure 30:
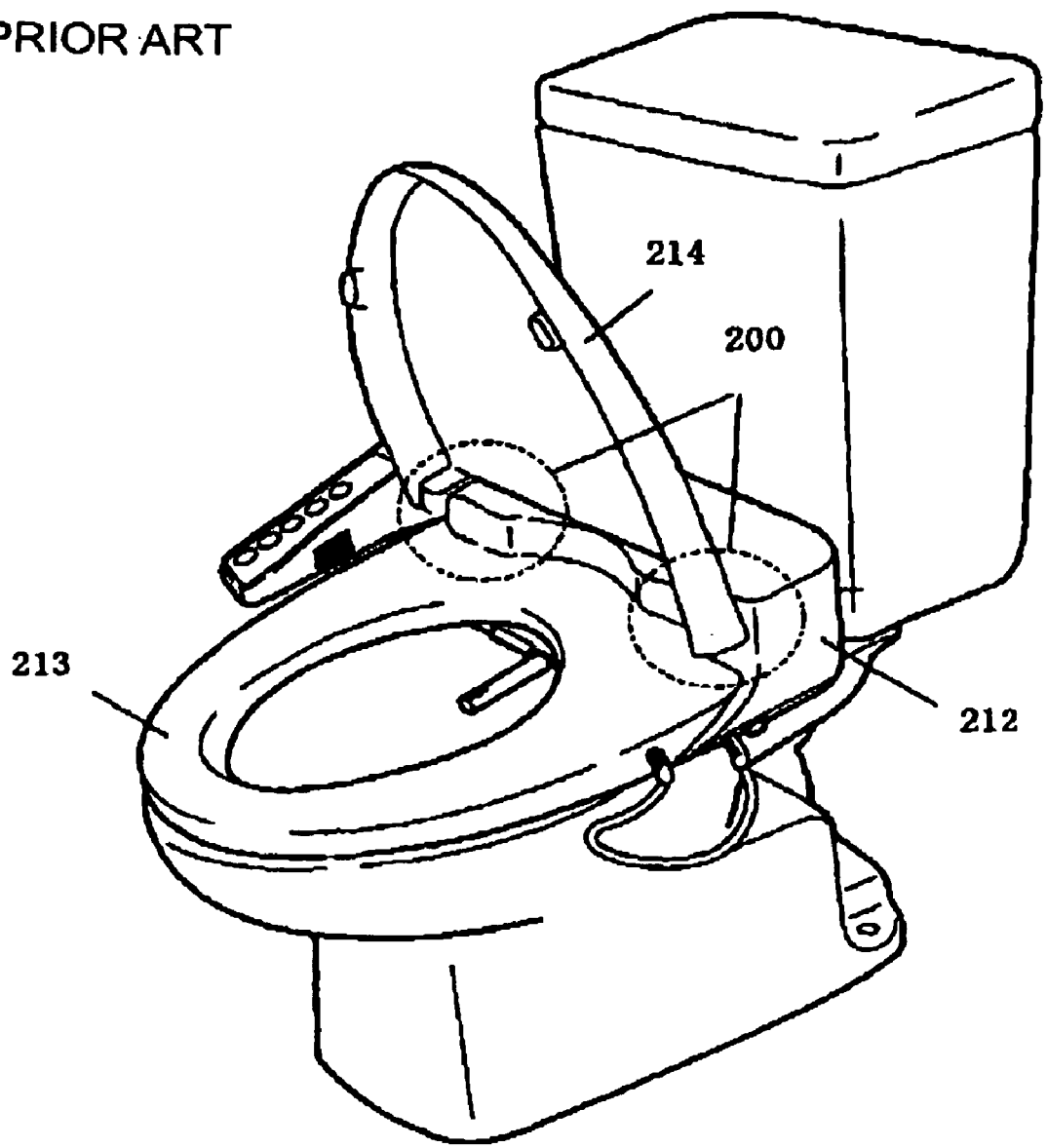
FIG. 30 is a perspective view showing a state in which the conventional damper device is incorporated into a toilet bowl.

As schematically shown in FIG. 28, the speed adjusting flow passage 132 is relatively deeply formed in a range where the rotational angle of the rotary shaft 130 is small and is relatively shallowly formed in a range where the rotational angle of the rotary shaft 130 is large.

Accordingly, the braking force applied to the rotary shaft 130 is made small within a range where the rotational angle of the rotary shaft 130 is small so as to allow the relatively fast rotation of the rotary shaft 130, while the braking force applied to the rotary shaft 130 is made large within a range where the rotational angle of the rotary shaft 130 is large so as to allow the relatively slow rotation of the rotary shaft 130.

Further, in the range where the rotational angle of the rotary shaft 130 is large, by forming the speed adjusting flow passage 132 with the depth which varies in two stages, it is possible to gradually reduce the rotational speed of the rotary shaft 130 in response to the rotational angle of the rotary shaft 130.

Here, in this embodiment, as shown in FIG. 22, the speed adjusting flow passage 132 is formed on the distal end side (the right end side in FIG. 13 and FIG. 14) of the columnar portion 134 of the rotary shaft 130. However, the speed adjusting flow passage 132 may be formed on the oil chamber side of the rotary body 160. In this manner, by forming the speed adjusting flow passage 132 on the rotary shaft 130 or the rotary body 160, it is unnecessary to provide a dedicated member for forming the speed adjusting flow passage 132 whereby the number of parts which constitute the damper device 3 can be reduced thus facilitating the manufacture of the damper device 3 and, at the same time, reducing the manufacturing cost of the damper device 3.

Figure 23:
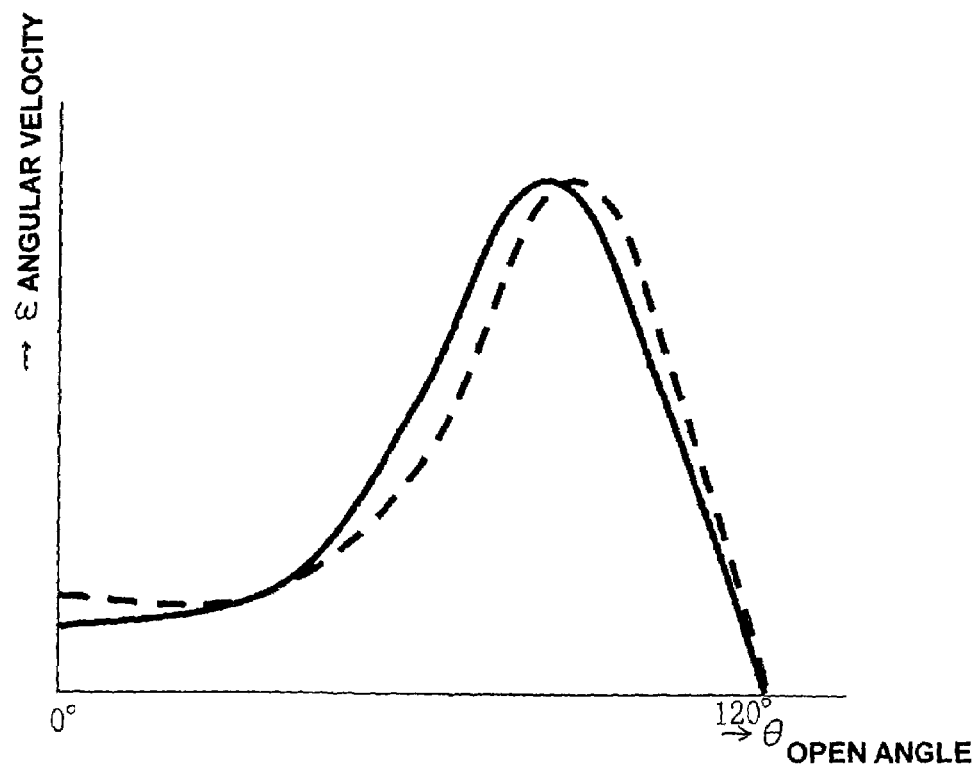
FIG. 23 is a graph showing the relationship between a rotational angle and an angular velocity of a toilet seat.

When this damper device 3 is incorporated into an open/close portion of a toilet seat 80 of a toilet as shown in FIG. 11, the relationship between an open angle θ and an angular velocity ω of the toilet seat 80 is set as shown in FIG. 23. That is, in the quick region of the damper device 3 (the region where the open angle θ of toilet seat 80 is relatively large), the angular velocity ω of the toilet seat 80 is gradually increased. Thereafter, the angular velocity ω of the toilet seat 80 becomes gradually slow and in the slow end region of the damper device 3 (the region where the open angle θ of the toilet seat 80 is relatively small), the angular velocity ω of the toilet seat 80 becomes gradually slow.

In FIG. 23, a case in which the depth of the speed adjusting flow passage 132 is set in two stages within the range where the rotational angle of the rotary shaft 130 is large is indicated by a solid line, while a case in which the speed adjusting flow passage 132 with the depth is set in one stage within the range where the rotational angle of the rotary shaft 130 is large is indicated by a dotted line. As can be understood from FIG. 23, when the depth of the speed adjusting flow passage 132 is set in one stage, the angular velocity ω is increased immediately before the toilet seat 80 is closed, while when the depth of the speed adjusting flow passage 132 is set in two stages, the elevation of the angular velocity ω immediately before the toilet seat 80 is closed can be prevented and hence, it is possible to surely alleviate an impact at the finishing time of the operation.

Here, in this embodiment, the depth of the speed adjusting flow passage 132 is set in two stages within the range in which the rotational angle of the rotary shaft 130 is large. However, the present invention is not limited to the case in which the depth of the speed adjusting flow passage 132 is set in two stages and the depth may be suitably set in a plurality of stages or continuously such that the rotational speed of the rotary shaft 130 is gradually decreased corresponding to the rotational angle of the rotary shaft 130.

Figure 24:
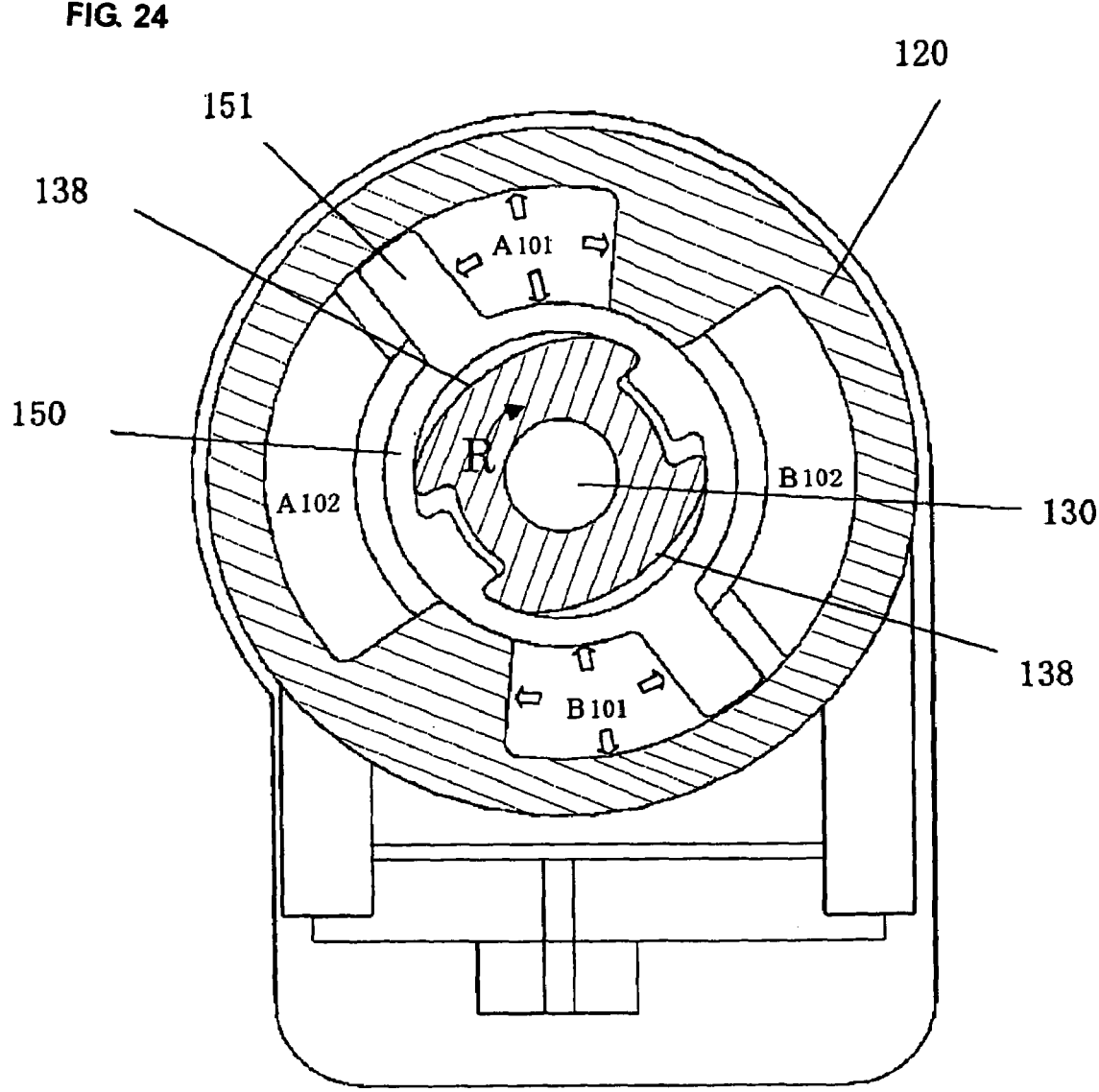
FIG. 24 is a cross-sectional view showing the rotary shaft and the valve element of the damper device according to the third embodiment.
Figure 25:
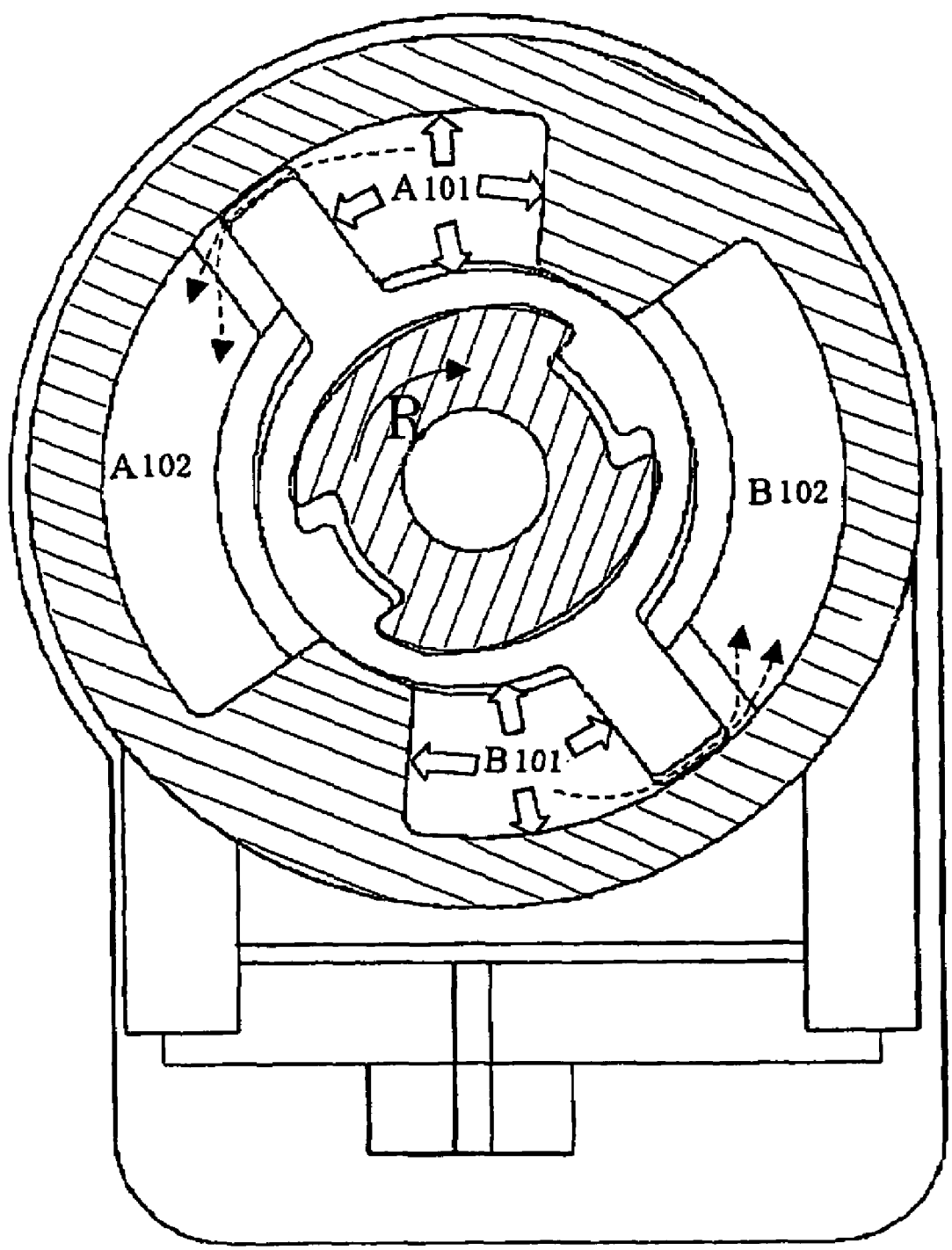
FIG. 25 is a cross-sectional view showing the rotary shaft and the valve element of the damper device according to the third embodiment.

Further, in this embodiment, as shown in FIG. 24 and FIG. 25, while forming the inner periphery of the ring portion 152 of the valve element 150' in a perfect circle, an outer periphery of the valve element mounting shaft 138 of the rotary shaft 130 is formed in an elliptical shape thus forming a gap between an inner peripheral surface of the ring portion 152 of the valve element 150' and the outer peripheral surface of the valve element mounting shaft 138 of the rotary shaft 130.

In this manner, by forming the gap between an inner peripheral surface of the ring portion 152 of the valve element 150' and the outer peripheral surface of the valve element mounting shaft 138 of the rotary shaft 130, as shown in FIG. 25, when the inner pressure of the oil chamber is sharply increased along with the sharp rotation of the rotary shaft 130 as in the case of the forcible closing of a toilet lid, the ring portion 152 is deformed toward the inner peripheral side due to the pressure and hence, the gap between the distal end of the valve portion 151 and the inner peripheral surface of the cylinder 120 is increased. Corresponding to an increased amount of the gap, the flow-passage cross-sectional area of the movement restricting flow passage is increased and hence, the quantity of oil which flows into the rear-side oil chamber from the front-side oil chamber is increased whereby the inner pressure of the front-side oil chamber is sharply lowered. In this manner, the gap which is increased due to the elevation of the oil pressure increases the flow-passage cross-sectional area of the oil flow passage and forms a bypass flow passage which leaks the pressure and the valve element 150' functions as a resilient flow passage member which increases the flow-passage cross-sectional area. Accordingly, it is possible to preliminarily prevent the rupture of the damper device 3 such as the leaking of oil Original caused by the elevation of the inner pressure of the front-side oil chamber.

As has been explained above, according to the damper device 3 of this embodiment, since the valve element 150' is arranged in the communication passage 152a in a state that the valve element 150' is movable in the circumferential direction of the rotary shaft 130 and the communication passage 152a is opened or closed by the movement of the valve element 150'. Accordingly, the constitution of the check valve 150 can be simplified whereby the manufacturing operation of the damper device 3 can be facilitated and, at the same time, the manufacturing cost of the damper device 3 can be reduced.

Further, the valve element 150' is arranged between the rotary shaft 130 and the rotary body 160 in a state that the valve element 150' is movable in the axial direction and the portion of the valve element 150' which is brought into contact with and is separated from the wing portion 135 is constituted of the inclined surface. Accordingly, at the time of operating the damper device 3, the valve element 150' is moved in the axial direction of the rotary shaft 130 and hence, it is possible to absorb the manufacturing error (size irregularities) of the rotary shaft 130 and, at the same time, the contact area between the valve element 150' and the wing portion 136 when the valve is closed is increased whereby the wear of the contacting/separating portion of the valve element 150' which is repeatedly brought original into contact with and separated from the wing portion 135 is reduced. Accordingly, it is possible to surely bring the check valve 150 into the valve-closed state thus realizing the stable quality and characteristics of the damper device 3.

Further, since the valve element 150' is constituted of the ring portion 152 which is loosely fitted on the rotary shaft 130 and the valve portions 151 which are formed on the ring portion 152, it is possible to assemble the valve portions 151 having a relatively fine shape of the check valve 150 to the rotary shaft 130 by merely mounting the ring portion 152 of the valve element 150' on the rotary shaft 130, whereby the manufacturing operation of the damper device 3 is facilitated.

Fourth Embodiment

Figure 26:
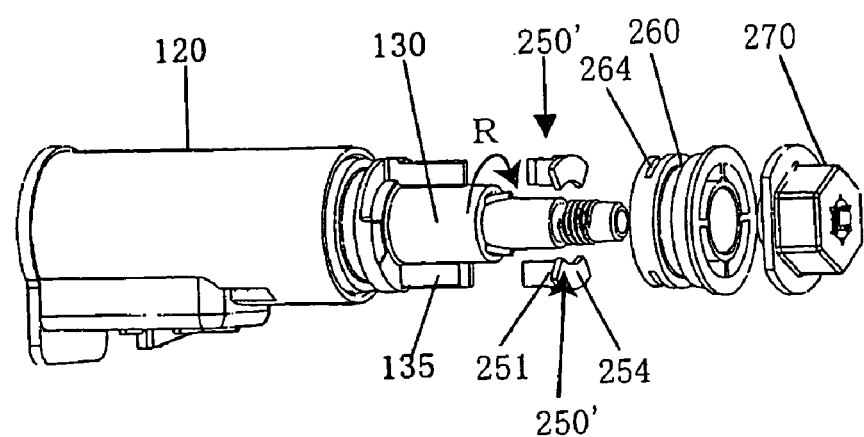
FIG. 26 is an exploded perspective view showing the damper device according to the fourth embodiment.

Although the damper device 4 of the fourth embodiment has, as shown in FIG. 26, the substantially same constitution as the damper device 3 of the third embodiment, the damper device 4 of the fourth embodiment differs from the damper device 3 of the third embodiment with respect to the constitution of the check valve 150, wherein the valve element is assembled to the rotary body with a play. Here, to simplify the explanation, parts having the identical functions as the parts of the third embodiment are given same symbols and the specific explanation of the parts which are already explained in conjunction with the third embodiment is omitted.

The valve element 250' is formed in an approximately T shape by arranging a valve portion 251 on a seat portion 254 having an approximately arcuate shape. A pair of approximately T-shaped valve-element accommodating grooves 264 is formed on an outer periphery of an oil chamber side (a left side in FIG. 26) of the rotary body 260 at a position where the rotary body 260 faces the rotary shaft. The valve elements 250' are loosely fitted in the valve element accommodating grooves 264. An open portion of the side wall (left side in FIG. 26) which faces the oil chamber of the valve element accommodating groove 264 is, to allow the valve element 250' to be rotatable with respect to the rotary body 260, formed with a large width by adding a given amount to a width of the valve portion 251 in the rotating direction.

In the damper device 4, the rotary body 260 which is assembled by loosely fitting the valve element 250' in the valve element accommodating groove 264 is inserted into the rotary shaft 130 and is fixed by a nut 270.

Accordingly, along with the rotation of the rotary shaft 130, the valve element 250' functions as a check valve as follows. That is, due to an action of the pressure which the valve element 250' receives from the oil in the oil chamber in the same manner as the valve element 150' of the third embodiment, the valve element 250' slides in the circumferential direction in the inside of the valve element accommodating groove 264 so as to bring valve element 250' into contact with the wing end portion 136 of the wing portion 135 or to separate the valve element 250' from the wing end portion 136 thus opening and closing the communication passage 252*a*.

Accordingly, it is possible to simplify the constitution of the check valve 150 and hence, the manufacturing operation of the damper device 4 can be facilitated and, at the same time, the manufacturing cost of the damper device 4 can be reduced.

Fifth Embodiment

Figure 27:
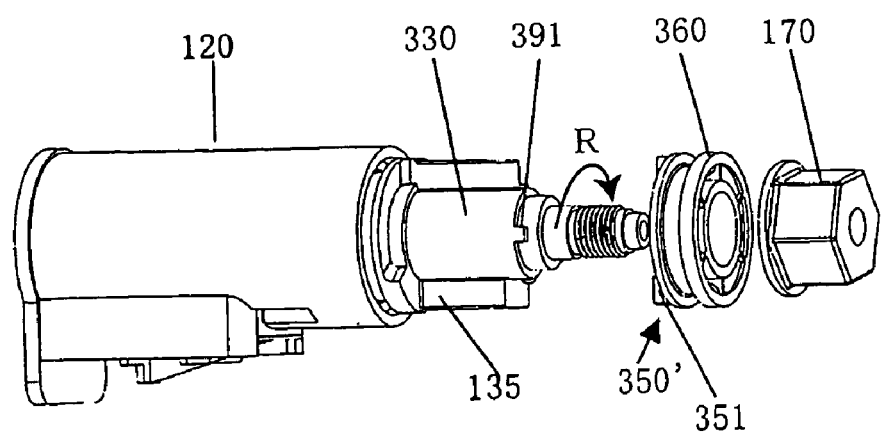
FIG. 27 is an exploded perspective view showing the damper device according to the fifth embodiment.

Although the damper device 5 of the fifth embodiment has, as shown in FIG. 27, the substantially same constitution as the damper device 3 of the third embodiment, the damper device 5 of the fifth embodiment differs from the damper device 3 of the third embodiment with respect to the constitution of the check valve 150, wherein valve portions of the check valve are integrally formed on the rotary body so as to allow the rotary body to function also as a valve element. Here, to simplify the explanation, parts having the identical functions as the parts of the third embodiment are given same symbols and the specific explanation of the parts which are already explained in conjunction with the third embodiment is omitted.

On a rotary shaft 333, a means such as the engaging portion 141 of the rotary shaft 130 of the embodiment 3 which engages and fixes the rotary body 160 to rotary shaft 130 in a state that the rotary body 160 is not rotatable is not formed.

On a side wall (left side in FIG. 26) of the rotary body 360 which faces the oil chamber, at positions which correspond to the above-mentioned projecting portions 391, a pair of recessed portions which are formed with a large width by an amount corresponding to a movable margin of a given size with respect to a width of the projecting portions 391 in the rotational direction are formed. Further, valve portions 351 having inclined surfaces similar to the inclined surfaces of the valve portions 151 of the valve elements 150' in the embodiment 3 are integrally formed on the side wall.

In the damper device 5, the projecting portions 391 of the rotary shaft 330 are assembled to the rotary body 360 in a state that the projecting portions 391 are loosely fitted in the above-mentioned pair of recessed portions of the rotary body 360.

Accordingly, when the rotary shaft 330 is rotated in the frontward direction (the direction indicated by a symbol R in FIG. 28), the rotary body 360 which is integrally formed with the valve portions 351 due to the action of pressure which the valve portions 351 receive from the oil in the oil chamber is also rotated so as to close the communication passages 252*a*. While holding this state, the rotary body 360 is further rotated together with the rotary shaft 330.

Further, when the rotary shaft 330 is rotated in the rearward direction (the direction opposite to the direction indicated by the symbol R in FIG. 28), the rotary body 360 which is integrally formed with the valve portions 351 due to the action of pressure which the valve portions 351 receive from the oil in the oil chamber is moved by the given moving margin with respect to the rotary shaft 330 while maintaining the state. Accordingly, the communication passages 252 assume the open state and are further rotated together with the rotary shaft 330. In this manner, the valve portions 351 which are integrally formed on the rotary body 360 are brought into contact with the wing end portion 136 of the wing portion 135 or are separated from the wing end portions 136 of the wing portions 135 of the rotary shaft 330 and hence, function as check valves which open and close the communication passage 252*a*.

Due to such a constitution, according to this embodiment, it is possible to assemble the check valves 150 on the rotary shaft 130 by merely mounting the rotary body 160 on the rotary shaft 130 whereby the manufacturing operation of the damper device 5 can be further facilitated.

INDUSTRIAL APPLICABILITY

According to the present invention described in claim 1, the movement restricting flow passages are formed between the inner wall of the cylinder and the wing portions and, at the same time, the selective communication passages are formed between the wing portions and one side wall out of the above-mentioned two side walls, and the side walls and the check valves are rotated along with the rotation of the wing portions and hence, when the rotary shaft is rotated, the check valves are not brought into contact with the inner wall of the cylinder. Accordingly, even when the damper device is used for a long period, there is no possibility that the check valves are worn and the gap is formed between the check valves and the inner peripheral wall of the cylinder and hence, the durability of the check valve is enhance and, at the same time, the lifetime of the damper device can be prolonged.

Further, according to the present invention described in claim 2, the side wall which defines the selective communication passage is formed of a side wall forming member which is replaceably engaged with the rotary shaft and hence, the check valve is easily mounted between the side wall member and the wing portion and the easiness of assembling of the damper device can be enhanced.

Further, according to the present invention described in claim 3, since the valve elements which open and close the selective communication passages are movably arranged in valve element accommodating chambers which are formed in the wing portions and/or side wall member at middle portions of the selective communication passages, the valve elements can be held in the valve element accommodating chambers in a stable manner and hence, it is possible to stabilize the quality and the characteristics of the damper device and, at the same time, to simplify the constitution of the check valve whereby the manufacturing operation of the damper device can be facilitated and the manufacturing cost of the damper device can be reduced.

Further, according to the present invention described in claim 4, the side wall member is arranged movably in the axial direction of the rotary shaft and, at the same time, on at least one of the valve elements and the side wall member which form closing portions with which the valve elements are brought into contact at the time of closing operation, the inclined surfaces which are inclined with respect to the moving direction of the valve element and the axial direction of the rotary shaft are formed and hence, due to an action of the pressure which the valve elements receive at the time of closing operation, the rotary shaft or the side wall member can be moved to the axial direction of the rotary shaft and, accordingly, even when the manufacturing errors (irregularities in sizes) are present in the respective portions, the selective communication passages can be securely closed by the valve elements and it is possible to stabilize the quality and the characteristics of the damper device.

Further, according to the present invention described in claim 5, since the valve elements are formed in an approximately columnar shape, the manufacture of the valve elements can be facilitated. Further, due to the symmetrical property of the shape of the valve elements, at the time of assembling of the valve elements, the valve elements can be assembled without considering the assembling direction, whereby the manufacturing cost can be reduced.

Further, according to the present invention described in claim 6, between the front-side oil chamber and the rear-side oil chamber, the bypass flow passage having the resilient flow passage member which is resiliently deformed to increase the flow passage cross-sectional area when the inner pressure of the viscous fluid is increased is formed and, at the same time, a sealing member which seals between the side wall member and the cylinder is used as the resilient flow passage member and hence, the resilient flow passage member can also have the function of the sealing member and the increase of the number of the constitutional parts can be prevented.

Further, according to the present invention described in claim 7, since the O-ring is used as the resilient flow passage member, the parts cost of resilient flow passage members can be reduced.

Further, according to the present invention described in claim 8, since the valve elements are arranged in a state that the valve elements which are brought into contact with and are separated from the wing portions are movable in the circumferential direction of the rotary shaft, the moving direction of the valve elements is agreed with the action direction of the flowing pressure of the viscous fluid, the valve elements can be smoothly moved and it is possible to stabilize the operation of the valve elements.

Further, according to the present invention described in claim 9, on at least one of the valve elements and the wing portions which form closing portions with which the valve elements are brought into contact at the time of closing operation, inclined surfaces which are inclined with respect to the moving direction of the valve element and the axial direction of the rotary shaft are formed and hence, at the time of closing operation of the check valves, due to the reaction of the pressure which the valve elements receive from the oil, the valve elements move to the axis direction of the rotary shaft until the valve elements themselves reach the adequate close portion. Accordingly, even when the manufacturing errors (irregularities in sizes) are present in the respective parts, the selective communication passages can be securely closed by the valve elements and it is possible to stabilize the quality and the characteristics of the damper device.

Further, according to the present invention described in claim 10, valve element portions which are brought into contact with and are separated from the wing portions are formed on the approximately circular annular ring portion which is loosely fitted on the rotary shaft. Accordingly, by merely mounting the ring portion on the rotary shaft, it is possible to assemble the valve portions to the rotary shaft and hence, the assembling operation of the valve portions can be facilitated.

Further, according to the present invention described in claim 11, the bypass flow passage having the resilient flow passage member which is resiliently deformed to increase a flow passage cross-sectional area when the pressure of the viscous fluid is increased is formed between the front-side oil chamber and the rear-side oil chamber, and, at the same time, the valve elements are used as the resilient flow passage member. Accordingly, it is possible to use the valve elements not only as the valve elements but also as the resilient flow passage members and hence, it is possible to prevent the increase of the number of constitutional parts.

Further, according to the present invention described in claim 12, the speed adjusting flow passages which adjust the flow rate of the viscous fluid which moves between the front-side oil chambers and the rear-side oil chambers in response to the rotational angle of the rotary shaft are formed between the side wall and the wing portions, and the speed adjusting flow passages are configured to decrease the flow passage cross-sectional area along with the increase of the rotational angle of the rotary shaft. Accordingly, at the starting time when the rotational angle of the rotary shaft is small, it is possible to rotate the rotary shaft fast and, at the same time, at the finishing time when the rotational angle of the rotary shaft is large, it is possible to increase the braking force which acts on the rotary shaft and hence, it is possible to alleviate the impact which occurs at the finishing time while shortening the time necessary for the rotation.

Further, according to the present invention described in claim 13, the speed adjusting flow passages are configured to decrease the flow passage cross-sectional area on the rotary finishing end side of the rotary shaft in a plurality of stages. Accordingly, it is possible to finely adjust the rotational speed of the rotary shaft at the finishing time and hence, the operational feeling of the damper device can be enhanced.

Further, according to the present invention described in claim 14, the air bleeding groove for bleeding the gas remaining in the oil chamber at the time of filling the viscous fluid in the oil chamber is formed in the cylinder. Accordingly, it is possible to take out the air remaining in the oil chamber at the time of assembling the damper device and hence, it is possible to prevent the generation of irregularities on the braking force which acts on the rotary shaft attributed to the mixing of the remaining air into the oil at the time of operating the damper device whereby it is possible to stabilize the quality and the characteristics of the damper device.

The invention claimed is:

1. A damper device, comprising:

an approximately tubular cylinder;

a rotary shaft which is rotatably arranged in the inside of the cylinder and forms wing portions on an outer peripheral portion of an approximately columnar shaft in a state that the wing portions project to an inner wall of the cylinder;

two side walls which are formed in a spaced-apart manner between the rotary shaft and the inner wall of the cylinder;

an oil chamber which is defined by said two side walls, the rotary shaft and the inner wall of the cylinder and in which a viscous fluid is filled;

movement restricting flow passages which restrict the movement of the viscous fluid between front-side oil chambers with respect to a rotational direction of the rotary shaft and rear-side oil chambers with respect to the rotational direction of the rotary shaft which are formed by dividing the oil chamber with the wing portions, the movement restricting flow passages being formed between the inner wall of the cylinder and the wing portions; and selective communication passages which are provided with check valves which selectively restrict the movement of the viscous fluid from the front-side oil chambers to the rear-side oil chambers in response to the rotational direction of the rotary shaft, the selective communication passages being formed between the wing portions and one of the two side walls, and the side walls and the check valves being rotatable along with a rotation of the wing portions, the check valves including valve elements and being arranged in a state that the valve elements, which are brought into and out of contact with the wing portions, are movable in the circumferential direction of the rotary shaft, whereby a rotation resistance force having directivity is applied to the rotary shaft due to the flow resistance which is generated when the viscous fluid moves from the front-side oil chambers to the rear-side oil chambers, the valve elements being constituted by forming valve element portions which are brought into and out of contact with the wing portions on an approximately circular annular ring portion which is loosely fitted on the rotary shaft.

2. A damper device, comprising:

an approximately tubular cylinder;

a rotary shaft which is rotatably arranged in the inside of the cylinder and forms wing portions on an outer peripheral portion of an approximately columnar shall in a state that the wing portions project to an inner wall of the cylinder;

two side walls which are formed in a spaced-apart manner between the rotary shaft and the inner wall of the cylinder;

an oil chamber which is defined by said two side walls, the rotary shaft and the inner wall of the cylinder and in which a viscous fluid is filled;

movement restricting flow passages which restrict the movement of the viscous fluid between front-side oil chambers with respect to a rotational direction of the rotary shaft and rear-side oil chambers with respect to the rotational direction of the rotary shaft which are formed by dividing the oil chamber with the wing portions, the movement restricting flow passages being formed between the inner wall of the cylinder and the wing portions; and selective communication passages which are provided with check valves which selectively restrict the movement of the viscous fluid from the front-side oil chambers to the rear-side oil chambers in response to the rotational direction of the rotary shaft, the selective communication passages being formed between the wing portions and one of the two side walls, and the side walls and the check valves being rotatable along with a rotation of the wing portions, the check valves including valve elements and being arranged in a state that the valve elements, which are brought into and out of contact with the wing potions, are movable in the circumferential direction of the rotary shaft, whereby a rotation resistance force having directivity is applied to the rotary shaft due to the flow resistance which is generated when the viscous fluid moves from the front-side oil chambers to the rear-side oil chambers a bypass flow passage having a resilient flow passage member which is resiliently deformed to increase a flow passage cross-sectional area when an inner pressure of the viscous fluid is increased being formed between the front-side oil chamber and the rear-side oil chamber, and, at the same time, the valve elements are used as the resilient flow passage member.

3. A damper device according to claim 1, or 2, wherein inclined surfaces which are inclined with respect to the moving direction of the valve element and the axial direction of the rotary shaft are formed on at least one of the valve elements or the wing portions which form closing portions with which the valve elements are brought into contact at the time of closing operation.